United States Patent
Brown et al.

(10) Patent No.: US 9,298,507 B2
(45) Date of Patent: Mar. 29, 2016

(54) DATA PROCESSING RESOURCE MANAGEMENT

(71) Applicant: International Business Machines Corporation, Armonk, NY (US)

(72) Inventors: Theresa M. Brown, Tucson, AZ (US); Nedlaya Y. Francisco, Tucson, AZ (US); Suguang Li, Tucson, AZ (US); Beth A. Peterson, Tucson, AZ (US); Raul E. Saba, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 112 days.

(21) Appl. No.: 14/037,367

(22) Filed: Sep. 26, 2013

(65) Prior Publication Data

US 2015/0089509 A1 Mar. 26, 2015

(51) Int. Cl.
*G06F 9/52* (2006.01)
*G06F 9/50* (2006.01)
*G06F 11/14* (2006.01)

(52) U.S. Cl.
CPC .............. *G06F 9/5016* (2013.01); *G06F 9/524* (2013.01); *G06F 11/14* (2013.01)

(58) Field of Classification Search
None
See application file for complete search history.

(56) References Cited

U.S. PATENT DOCUMENTS

| | | | |
|---|---|---|---|
| 4,494,193 A * | 1/1985 | Brahm et al. | 709/225 |
| 5,095,421 A * | 3/1992 | Freund | 718/101 |
| 5,682,551 A * | 10/1997 | Pawlowski et al. | 710/36 |
| 5,941,967 A | 8/1999 | Zulian | |
| 6,427,193 B1 | 7/2002 | Hughes et al. | |
| 6,718,448 B1 | 4/2004 | Ofer | |
| 6,792,483 B2 | 9/2004 | Schmidt | |
| 8,286,182 B2 | 10/2012 | Chan | |
| 8,402,464 B2 | 3/2013 | Dice et al. | |
| 2003/0028638 A1 * | 2/2003 | Srivastava et al. | 709/225 |
| 2009/0271794 A1 * | 10/2009 | Zoll et al. | 718/103 |

FOREIGN PATENT DOCUMENTS

| | | |
|---|---|---|
| CN | 101154210 | 4/2008 |
| JP | 62003367 | 1/1987 |

OTHER PUBLICATIONS

English translation of JP62003367 published Jan. 9, 1987.
English translation of CN101154210 published Apr. 2, 2008.

* cited by examiner

*Primary Examiner* — Kris Rhu
(74) *Attorney, Agent, or Firm* — William K. Konrad; Konrad Raynes Davda & Victor LLP

(57) ABSTRACT

In accordance with one aspect of the present description execution of a particular command by a data processor such as a storage controller, may include obtaining priority over a resource which is also associated with execution of another command, setting a timer for the duration of a dynamically set timeout period, and detecting a potential deadlock condition as a function of expiration of the dynamically set timeout period before execution of the particular command is completed. In one embodiment, the particular command releases priority over the resource upon detection of the potential deadlock condition, and then reobtains priority over the resource in a retry of the command. It is believed that such an arrangement can relieve a potential deadlock condition, allowing execution of one or more commands including the particular command to proceed. Other features and aspects may be realized, depending upon the particular application.

21 Claims, 13 Drawing Sheets

| Action | Holding Source Task Lock | Waiting for Source Task Lock | Holding Source Extent | Waiting for Source Extent | Notes: |
|---|---|---|---|---|---|
| Receive Incremental PIT Snap Copy Establish command -- Task A | | | | | |
| Task A - Acquire PIT Snap Copy task lock for the source | Task A | | | | |
| Task A - Block Source extent range | Task A | | Task A | | |
| Task A -- Process source portion of Incremental PIT Snap Copy Establish cmnd | Task A | | Task A | | |
| Task A - Release PIT Snap Copy task lock for the source | | | Task A | | |
| Task A - Acquire PIT Snap Copy task lock for the target | Task A | | Task A | | |
| Task A - Block target extent range | Task A | | Task A | | |
| Task A - Process target portion of Incremental PIT Snap Copy Establish cmnd | Task A | | Task A | | |
| Receive Host Write -- Task B | | | Task A | | |
| Task B - Block Source extent range | | | Task A | Task B | At this point Task B is waiting until Task A gives up the source extent |
| Receive Incremental PIT Snap Copy Establish cmnd --Task C | | | Task A | Task B | |
| Task C - Acquire PIT Snap Copy task lock for the source | Task C | | Task A | Task B | |
| Task C - Block Source extent range | Task C | | Task A | Task B / Task C | At this point Task C is waiting until Task A and Task B no longer need the source extent |
| Task A - Release PIT Snap Copy task lock for the target | Task C | | Task A | Task B / Task C | |
| Task A - Release target extent range | Task C | | Task A | Task B / Task C | |
| Task A - Acquire PIT Snap Copy task lock for the source | Task C | Task A | Task A | Task B / Task C | At this point Task A is waiting until Task C gives up the source task lock. This is a deadlock. |

FIG. 7

| Action | Holding Source Task Lock | Waiting for Source Task Lock | Holding Source Extent | Waiting for Source Extent | Notes: |
|---|---|---|---|---|---|
| Receive Incremental PIT Snap Copy Establish command -- Task D | | | | | |
| Task D - Acquire PIT Snap Copy task lock for the source | Task D | | | | |
| Task D - Block Source extent range | Task D | | Task D | | |
| Task D - Perform initial work needed for source increment | Task D | | Task D | | |
| Task D - Release PIT Snap Copy task lock for the source | | | Task D | | |
| Task D - Acquire PIT Snap Copy task lock for the target | | | Task D | | |
| Task D - Block target extent range | | | Task D | | |
| Task D - Perform all work needed for target increment | | | Task D | | |
| Receive Host Write -- Task E | | | Task D | | |
| Task E - Request source extent range Block | | | Task D | Task E | At this point Task E is waiting until Task D releases the source extent block. |
| Receive Incremental PIT Snap Copy Establish Command --Task F | | | Task D | Task E | |
| Task F - Acquire PIT Snap Copy task lock for the source | Task F | | Task D | Task E | |
| Task F -- Request Source extent range Block | Task C | | Task D | Task E / Task F | Task F waiting until source extent block granted to Task F or potential deadlock detected. |
| Task D - Release PIT Snap Copy task lock for the target | Task F | | Task D | Task E / Task F | |
| Task D - Release target extent range | Task F | | Task D | Task E / Task F | |
| Task D – Request PIT Snap Copy task lock for the source | Task F | Task D | Task D | Task E / Task F | |
| Task F - Deadlock detected waiting for Source Extent Block. Retry Task F command. | | Task D | Task D | Task E | By retrying Task F, resources held by Task F are released. |
| Task D - Acquire PIT Snap Copy task lock for the source | Task D | | Task D | Task E | |
| Task D - Complete work needed for source increment | Task D | | Task D | Task E | |
| Task D - Release Source extent range | Task D | | | Task E | |
| Task E – Acquire Source extent range Block. Write command completes. | Task D | | Task E | | |
| Task D - Release Source task lock | | | | | |
| Retry Incremental PIT Snap Copy Establish --Task F | | | | | |
| Task F is allowed to complete | | | | | |

FIG. 8

DATA PROCESSING RESOURCE MANAGEMENT

TECHNICAL FIELD

This description relates in general to distributed computing systems, and more particularly, to a method, system and computer program product for managing resources used in data processing in a distributed computing system.

BACKGROUND

One or more hosts may store large quantities of data in a group of storage units, which is typically controlled by a storage controller, also referred to herein as a storage control unit. Examples of such a storage controllers include the IBM TotalStorage® Enterprise Storage Server® (ESS) and the IBM System Storage DS8000 series. A storage controller such as the ESS or DS8000 may provide a number of functions accessible by the hosts for protecting data, backing the data up, and making the data available for use.

Before a host accesses data through a storage controller or other storage system, a request may be made to block other operations from accessing that data. For example, a write operation may request that other operations be blocked from accessing specified data such as one or more rows in a data table, one or more tracks of a hard disk drive, or the like. If one operation is granted the block, referred to herein as a data unit block, the first operation may access the specified data without a second operation being allowed access to the specified data. The first operation has exclusive access to the specified data until the first operation releases the data unit block. For transactions such as airline reservations, credit card transactions, or similar transactions, a data unit block function is designed to allow a transaction to be completed before a second operation can access the transaction data.

Amongst the functions which may be provided by a storage controller is a data preservation function which can preserve an identified set of data at a particular point in time. For example, the ESS and DS8000 series storage controllers support a data preservation function referred to as "FlashCopy®" which enables a point-in-time snap copy to be made of a set of tracks in a source volume. One feature of such data preservation functions is that the data of the copy is frequently made immediately available for read or write access. The identified data may be for example, a set of tracks which can consist of an entire volume, a data set, or just a selected set of tracks, for example.

In one mode of a data preservation function, a copy of all of the data to be preserved at the particular point in time, is made by copying the identified data from the source volume to the target volume, typically in a background copy mode. If a host attempts to update the data on the source volume which is being preserved, that update is typically temporarily delayed until the old data to be updated is copied to a target volume for preservation. Once a particular data location of the set of identified data on the source volume has been successfully copied to the target volume by the background copy operation, that data location on the source volume is freed for subsequent immediate updating by a host.

Before a particular task such as a command is permitted to proceed affecting a particular storage unit such as a storage volume of a storage subsystem, a request may be made to block other tasks of a similar nature from accessing that storage unit while the first task is being executed. For example, an establish command such as a FlashCopy® establish command, may seek to establish a point-in-time snap copy relationship between storage locations in a source volume and storage locations in a target volume. Accordingly, a request is made for a FlashCopy® task lock to block other FlashCopy® establish operations from accessing the source volume while the source volume portion of the first FlashCopy® establish command is executed.

Thus, if one task such as the FlashCopy® establish task is granted the FlashCopy® task lock for a particular source volume, that FlashCopy® establish task may access the specified source volume without a second FlashCopy® establish Task being allowed to access the specified source volume for purposes of establishing another FlashCopy® relationship. The first FlashCopy® establish task has exclusive access to the specified volume until the first FlashCopy® establish task releases the FlashCopy® task lock for that volume. Once the source volume portion of the FlashCopy® establish task is completed, the FlashCopy® task lock for the source volume may be released and a request may be made for a FlashCopy® task lock to block other FlashCopy® establish operations from accessing the target volume while the target volume portion of the FlashCopy® establish command is executed. Once the target volume portion of the FlashCopy® establish task is completed, the FlashCopy® task lock for the target volume may be released.

SUMMARY

Provided are a method, system, and program for monitoring the duration of time between receipt of a first command from a command initiator and receipt of a second command from the command initiator and associated with the first command, dynamically setting a timeout period as a function of the monitored duration of time. Upon receiving a plurality of additional commands including a third command from the command initiator, partially executing the plurality of additional commands wherein partially executing the third command includes setting a timer for the duration of the dynamically set timeout period and obtaining priority over a first resource which is also associated with execution of a command of the plurality of additional commands other than the third command. A deadlock condition may be detected as a function of expiration of the dynamically set timeout period before execution of the third command is completed, wherein the deadlock condition results from completion of execution of the third command being blocked by another command of the plurality of additional commands having obtained priority over a second resource which is also associated with execution of the third command. In one aspect of the present description, priority of the third command over the first resource upon detection of the deadlock condition may be released and subsequently reobtained. In one embodiment, the deadlock condition may be resolved in this manner. Other embodiments, aspects and features are described herein.

BRIEF DESCRIPTION OF THE DRAWINGS

FIG. 7 is a table illustrating an example of prior operations of multiple incremental point-in-time snap copy establish commands and a host write command.

FIG. 8 is a table illustrating an example of operations of multiple incremental point-in-time snap copy establish commands and a host write command, utilizing data processing resource management in accordance with one embodiment of the present description.

DETAILED DESCRIPTION

Figure 1:
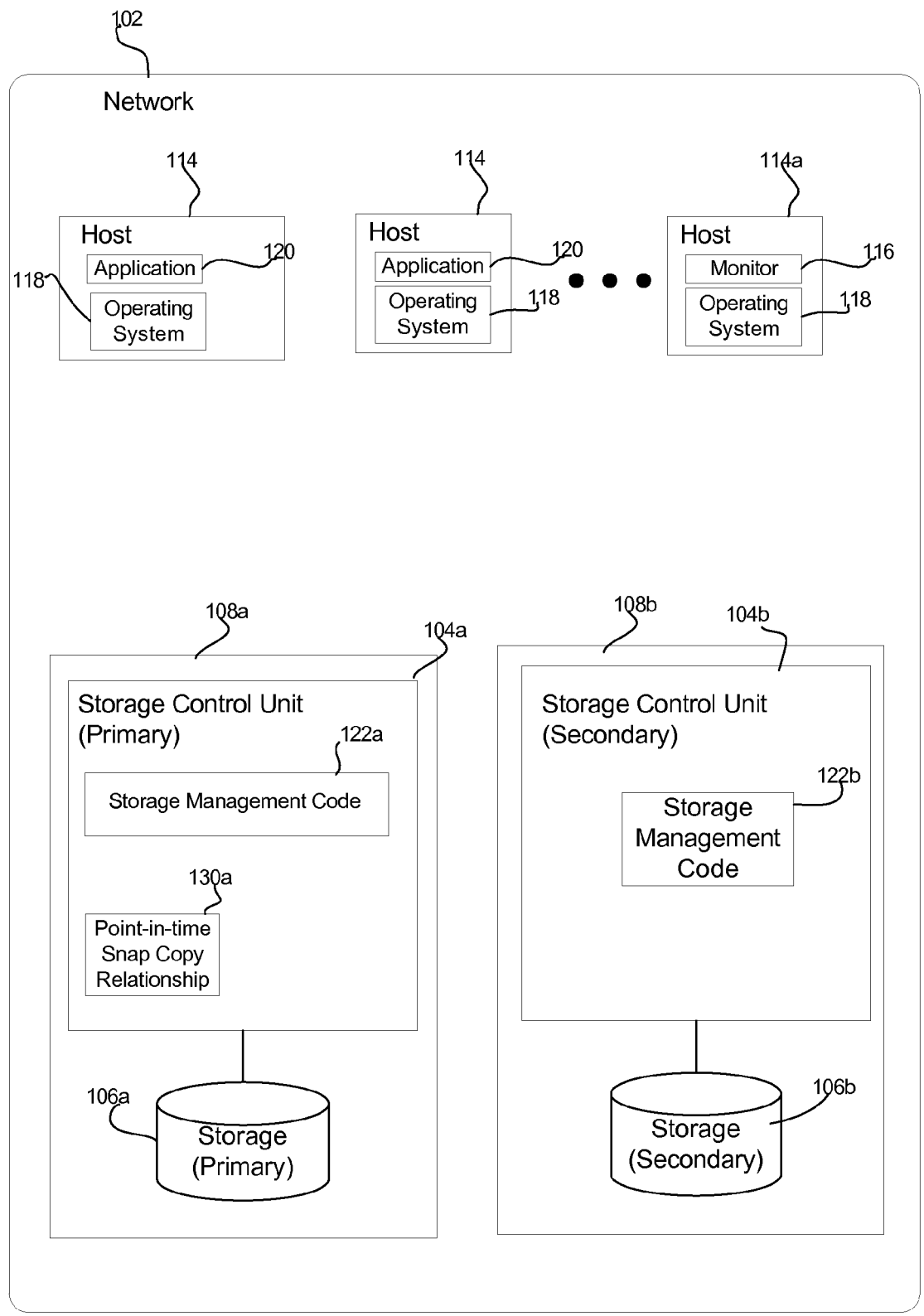
FIG. 1 illustrates an example of a network computing environment, employing data processing resource management in accordance with one embodiment of the present description.

FIG. 1 illustrates an embodiment of a network computing environment having input/output (I/O) operations issued by at least one host to access storage locations of a designated storage unit, for reading data from and writing updates to the storage locations of the designated storage unit. It is appreciated that situations arise in which conflicts over resources utilized in connection with executing commands may lead to a deadlock condition in which one or more commands are blocked from completing execution due to lack of access to appropriate resources. For example, a deadlock condition may result in blocking completion of execution of a first command by a second command having obtained priority over a resource which is also associated with execution of the first command.

In accordance with one aspect of the present description, execution of a particular command may include obtaining priority over a resource which is also associated with execution of another command, setting a timer for the duration of a dynamically set timeout period, and detecting a potential deadlock condition as a function of expiration of the dynamically set timeout period before execution of the particular command is completed. In one embodiment, the particular command releases priority over the resource upon detection of the potential deadlock condition, and then reobtains priority over the resource in a retry of the command. As explained in greater detail below, it is believed that such an arrangement can relieve a potential deadlock condition, allowing execution of one or more commands including the particular command to proceed. It is appreciated that other features may be realized instead of or in addition to those discussed herein, depending upon the particular application.

In another aspect, the timeout period may be dynamically set as a function of a monitored duration of time. In one embodiment, the duration of time between receipt of a first command from a command initiator and receipt of a second command such as a reset command resetting an input/output operation which included the first command from the command initiator, may be monitored. Thus, the timeout period may be dynamically set as a function of the monitored duration of time between receipt of a command and receipt of a reset command resetting the associated I/O operation from the command initiator. In addition, a maximum number of retries of a command may be dynamically set as a function of a monitored duration of time. In this manner, command resets and retries at the host level may, in some embodiments, be reduced or eliminated. It is appreciated that other features may be realized instead of or in addition to those described herein, depending upon the particular application.

Although the embodiment of FIG. 1 is described in connection with various commands including a copy relationship establishment command, it is believed that aspects of the present description are applicable to other types of commands and input/output operations, depending upon the particular application. Similarly, although the present description refers to a block of an extent or extent range, it is appreciated that a block may be applied to other units of data storage. In a similar manner, although the present description refers to a task lock in connection with an extent or extent range and a command such as an establish command, it is appreciated that a task lock may be applied to other units of data storage and to other types of commands and operations.

In the illustrated embodiment, a copy relationship identifies a source storage location, such as a primary storage location, and a target storage location, such as a secondary storage location, in which data stored at the source storage location is to be mirrored or otherwise copied to the target storage location. Thus, as used herein, a primary storage location and a secondary storage location are storage locations related by a copy relationship.

Furthermore, as used herein, the term "storage location" refers to a storage location containing one or more units of data storage such as one or more volumes, cylinders, tracks, segments, extents, or any portion thereof, or other unit or units of data suitable for transfer. Thus, a source storage location and the associated target storage location may each be a storage volume, wherein the volumes may be within the same storage device or may be within different devices or at different sites. However, it is appreciated that a source storage location and a target storage location may each be of a size other than a volume, for example.

In the illustrated embodiment, a network 102 includes storage control units or storage controllers 104a, 104b, and data storages 106a, 106b. The storage control unit 104a and its associated data storage 106a provide a storage subsystem 108a. Similarly, the storage control unit 104b and its associated data storage 106b provide a storage subsystem 108b. The storage control units 104a, 104b, manage the copying of updates from a primary storage subsystem to a secondary storage subsystem. In the configuration illustrated in FIG. 1, the storage control unit 104a and the data storage 106a have been configured as a primary storage control unit and the primary storage, respectively. Similarly, the storage control unit 104b and its data storage 106b have been configured as a secondary storage control unit and a secondary storage, respectively. Hence, in the configuration depicted in FIG. 1, the storage control unit 104a will be referred to as a primary storage control unit 104a and the data storage 106a will be referred to as a primary storage 106a. Similarly, the storage control unit 104b will be referred to as a secondary storage control unit 104b and the data storage 106b will be referred to as a secondary data storage 106b. It is appreciated that the storage control units and storages may be reconfigured to change the associated primary and secondary roles within a copy relationship.

The network 102 further includes one or more hosts 114 writing updates to the primary storage 106a. At least one such host 114, such as the host 114a, has in this embodiment, storage management functions including a monitor program 116 monitoring failures in the availability of the primary storage control unit 104a. In some embodiments, the monitor program 116 may be operated in a device apart from the hosts. The components 104a, 104b, 106a, 106b, and 114 are connected to the network 102 and the network 102 enables communication among these components. The network 102 may include one or more switches to provide one or more paths of communication between the different network 102 elements.

The primary storage control unit 104a is located at a first site and the secondary storage control unit 104b is located at a second site which may be geographically or functionally remote from the first site. Thus, in this example, the first site may be at a local site and the second site may be at a geographically remote site separated by a short or long geographical distance from the local site. Alternatively, the local and remote sites may be relatively close such as in different buildings in the same general geographical location, in different rooms of the same building, in different machines in the same room, or in different portions or partitions of the same machine, of the network 102.

A typical host 114 includes an operating system 118 and an application 120 that writes updates to the primary 106a or secondary 106b storage. The host 114a which includes the monitor program 116 may omit the update writing applications 120 in some embodiments. The primary 104a and secondary 104b storage control units include storage management software 122a and 122b to manage data copying operations including data mirroring operations.

The monitor program 116 may monitor the primary storage control unit 104a and upon detecting a failure event, may utilize a storage unit swap manager of an operating system 118 of a host 114, to cause a failover operation to cause updates from the host 114 to be sent to the secondary storage control unit 104b instead of to the primary storage control unit 104a. If the system fails while updates to the primary storage 106a are being applied to the storage 106b, then the updates that did not complete being mirrored to the storage 106b can be recovered and applied to the storage 106b.

The storage management code 122a, 122b is invoked to establish a copy relationship such as a point-in-time snap copy relationship 130a, between first and second storage locations in a storage subsystem, such as the primary storage subsystem 108a, for example. The storage control units 104a, 104b may comprise enterprise storage servers, such as the IBM DS8000 series, for example. In the illustrated embodiment, the point-in-time snap copy relationship 130a comprises a copy relationship for a pair of storage locations in which a snap shot of the data in a set of storage locations referred to as the source locations, is taken at a particular point in time, and copied over to a second set of storage locations referred to as the target locations. It is appreciated that other types of copy relationships may be established, depending upon the particular application.

The storage management code 122a, 122b managing the mirroring operation may be implemented using synchronous copy operations, such as a peer-to-peer remote copy (PPRC) program. An example of a PPRC program is the IBM Tivoli Productivity Center for Replication copy program that enables the copying of updates to the primary storage 106a, to the secondary storage 106b. The storage management code 122a, 122b, may also implement asynchronous remote copy operations where updates to the primary 106a or secondary 106b storage are mirrored to a corresponding location in at a remote site. The described operations may be implemented with other programs such as other copy programs or other global recovery programs.

The network 102 includes a fabric which may comprise a Storage Area Network (SAN), Local Area Network (LAN), Intranet, the Internet, Wide Area Network (WAN), peer-to-peer network, wireless network, arbitrated loop network, etc. The storages 106a, 106b may comprise an array of storage devices, such as a Just a Bunch of Disks (JBOD), Direct Access Storage Device (DASD), Redundant Array of Independent Disks (RAID) array, virtualization device, tape storage, flash memory, etc.

Communication paths from the storage subsystems to the hosts 114 may be based upon a particular host attachment protocol such as FICON, for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

In the illustrated embodiment, communication hardware associated with the communication paths between the nodes includes switches, routers, cables, modems, adapters, power supplies, etc. Communication software associated with the communication paths includes instructions and other software controlling communication protocols and the operation of the communication hardware in accordance with the communication protocols, if any. It is appreciated that other communication path protocols may be utilized, depending upon the particular application.

Figure 2:
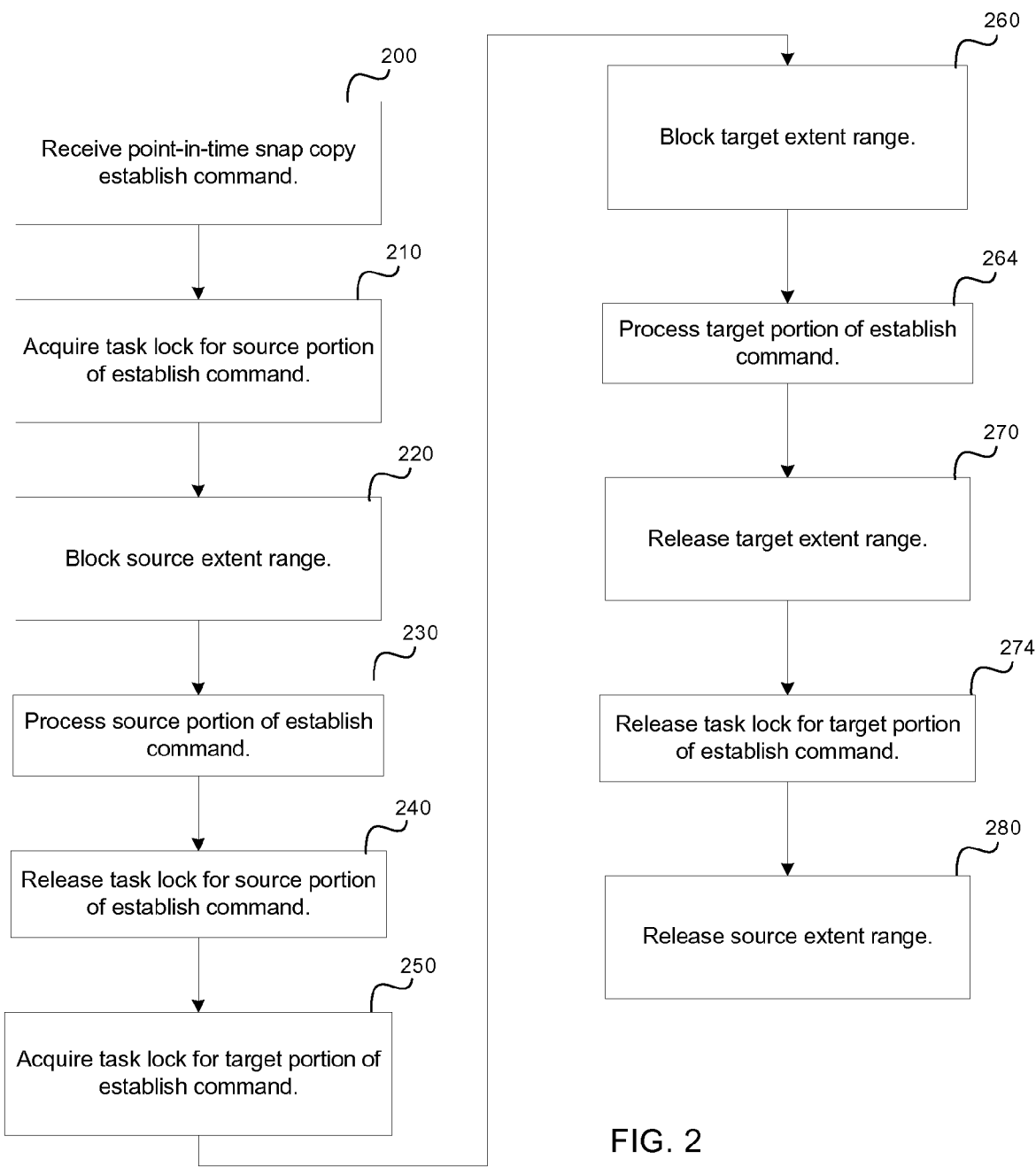
FIG. 2 illustrates an example of prior operations of a point-in-time snap copy establish command.

In accordance with one aspect of the present description, it is believed that overlapping execution of various commands may lead to a conflict over resources which may lead to a deadlock condition. FIG. 2 illustrates an example of operations of a previous point-in-time snap copy establish command such as a FlashCopy® command which proceeded without a conflict over resources In a first operation, a storage controller receives (block 200) from a host a command to establish a point-in-time snap copy relationship. The point-in-time snap copy establish command identifies the source storage locations and the target storage locations of the point-in-time snap copy relationship. In this example, the identified storage locations are identified as one or more extent ranges. In response, the storage management acquires (block 210) a point-in-time snap copy task lock for the source extent range, which blocks other point-in-time snap copy establish commands from establishing relationships involving the identified source extent range. In addition, the storage management blocks (220) other input/output operations from accessing the identified source extent range to write updates to those storage locations. However, read operations by other ongoing input/output operations of this or other hosts are permitted to read data from the identified source extent range.

Have acquired the point-in-time snap copy task lock and write update block for the identified source extent range, the storage management processes (block 230) the source portion of the point-in-time snap copy establish command. For example, the storage management typically writes appropriate metadata to nonvolatile memory and examines appropriate bitmaps to maintain atomicity of the transactions. Upon completion of the source portion processing, the storage management releases (block 240) the point-in-time snap copy task lock allowing other point-in-time snap copy establish commands to establish relationships involving the identified source extent range.

In addition, the storage management acquires (block 250) a point-in-time snap copy task lock for the target extent range which blocks other point-in-time snap copy establish commands from establishing copy relationships in connection with the target extent range. In addition, the storage management blocks (260) other input/output operations from accessing the identified target extent range to write updates to those storage locations. However, read operations are permitted to read data from the identified extent range.

Have acquired the point-in-time snap copy task lock and write update block for the identified target extent range, the storage management processes (block 264) the target portion of the point-in-time snap copy establish command. Here too, the storage management writes appropriate metadata to non-volatile memory and examines appropriate bitmaps to maintain atomicity of the transactions.

Upon completion of the target portion processing, the storage management releases (block 270) the block of the target extent range. Accordingly, other input/output operations may access the identified target extent range to write updates as appropriate. In addition, the storage management releases (block 274) the point-in-time snap copy task lock allowing other point-in-time snap copy establish commands to establish relationships involving the identified target extent range. Still further, the storage management releases (block 280) the block of the source extent range, allowing other input/output operations to access the identified source extent range to write updates as appropriate. At this point, execution of the point-in-time snap copy establish command is complete, having established a point-in-time snap copy relationship between the identified source extent range and the identified target extent range, and released the resources utilized in establishing the relationship.

As previously mentioned, it is believed that execution of an input/output operation overlapping execution of a point-in-time snap copy establish command previously may have caused a conflict over resources which may have led to a deadlock condition. For example, if the storage controller received a write update command to write updates to one or more extent ranges which overlapped both the source and target extent ranges of the point-in-time snap copy establish command, a deadlock condition may have resulted. For example, the point-in-time snap copy establish command may have blocked access to a portion of the source extent range to which the input/output write update operations sought to write updates. Conversely, the input/output write update command may have blocked access to a portion of the target extent range which the point-in-time snap copy establish command sought to access to process the target extent range portion of the point-in-time snap copy establish command. If so, a deadlock condition may be resulted, in which each command prevented the other from completion.

Figure 3:
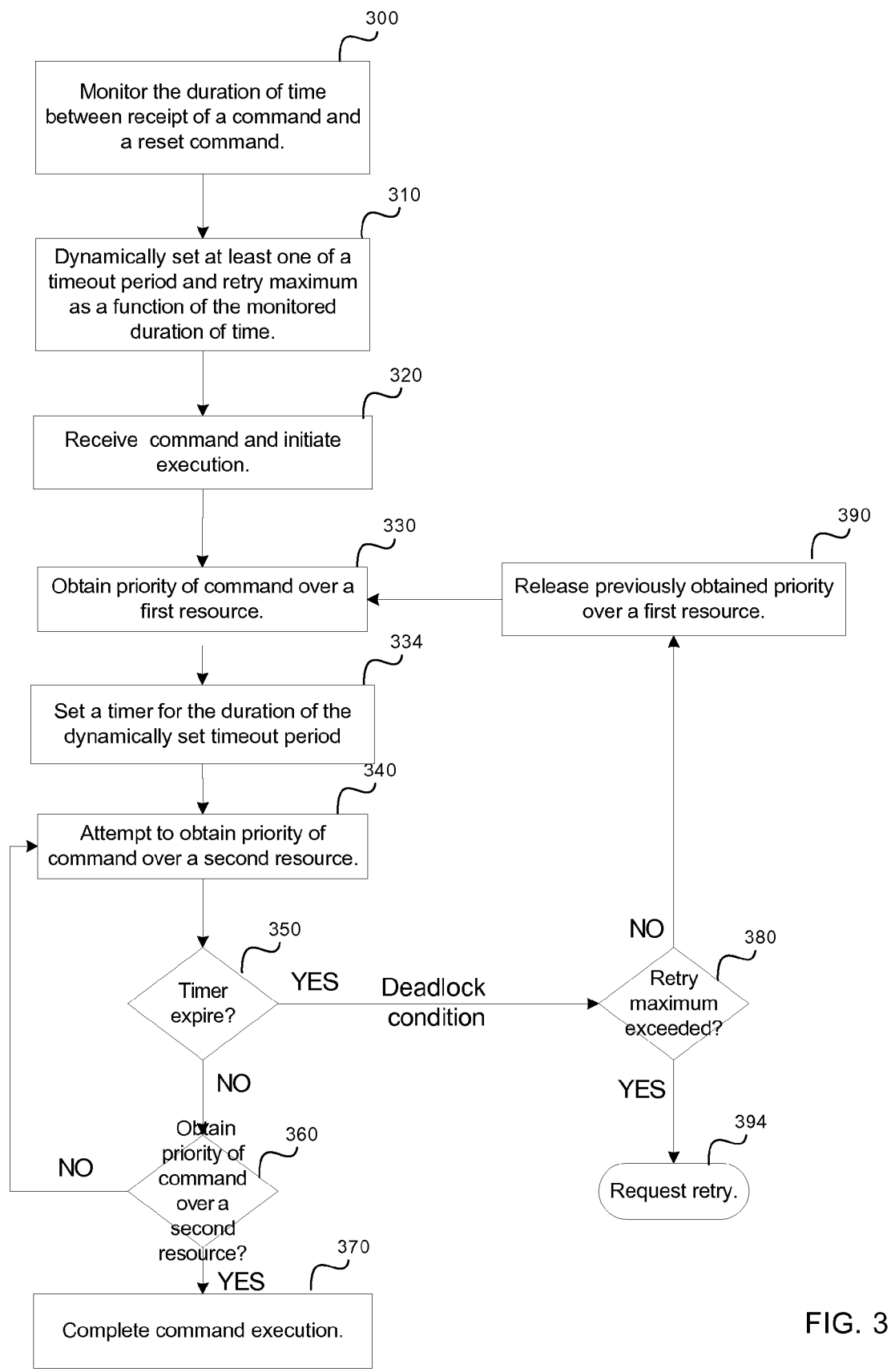
FIG. 3 illustrates an embodiment of operations of a point-in-time snap copy establish command utilizing data processing resource management in accordance with one embodiment of the present description.

In accordance with one aspect of the present description, FIG. 3 illustrates one example of operations of a networked storage system in which resulting deadlock conditions may be reduced or eliminated. In a first operation, storage management, such as the storage management 122a (FIG. 1), for example, of the storage controller 108a, monitors (block 300) the duration of time between receipt of a command and a subsequent reset command from a host such as one of the hosts 114.

An operating system such as 118 of a host 114 may include a timer associated with the allowed duration of an input/output (I/O) operation which typically includes a chain of commands. The allowed duration of an I/O operation considered as a whole, including the chain of commands, is referred to herein as an I/O timeout period. In one embodiment, the facility that keeps track of I/O interrupts, informing the operator and keeping a record whenever an unexpected interrupt fails to occur in a preset time interval, such as the I/O timeout period, is a Missing Interrupt Handler (MIH). If an I/O operation as a whole, including the chain of commands of the I/O operation, fails to complete within the I/O timeout period allotted for it by the MIH setting, the MIH releases critical resources, which the I/O operation might otherwise continue to hold notwithstanding that it is not making sufficient progress, preventing other I/O operations from using those resources. To clear resources, the operating system may issue a reset to the storage controller to stop processing the I/O operation. Error Recovery Procedures (ERP) may then determine how to retry the I/O operation that needed to be reset, halted, cleared, cancelled, etc.

In accordance with the present description, it is recognized that the I/O timeout period set in a particular host may vary from host to host, even in hosts running on the same hardware. It is further recognized that the I/O timeout period for a particular host may be substantially determined by a storage controller by tracking when a particular command is received from a host, and tracking the duration of time between receipt of that command and a subsequent reset command issued by that host to reset that particular command. The I/O timeout period for a particular host may be determined to a satisfactory degree of accuracy, in accordance with the last measured duration of time between a command and its subsequent reset command from the host, by a running average of the measured durations of time for a particular host, or by any suitable computational or statistical process, depending upon the particular application.

Having monitored the duration of time between receipt of a command from a host in the chain of commands in connection with a particular I/O operation and a subsequent reset command for that I/O operation from that host, the storage management of the storage controller may dynamically set (block 310) a storage controller level timeout period as a function of the host level timeout period as determined by the monitored duration of time between commands of the host. Thus, as the host level timeout period changes either over time, or from host to host, the storage level timeout period may be dynamically set, allowing the storage controller level timeout period to dynamically adjust as conditions change. As explained in greater detail below, the storage level timeout period may be used in conjunction with a resource acquisition or command retry to relieve conflicts over resources thus reducing or eliminating deadlock conditions, in a manner which reduces or eliminates host level reset and retry commands.

In addition, the storage management of the storage controller may dynamically set (block 310) a storage controller level retry maximum as a function of the host level timeout period as determined by the monitored duration of time between commands of the host. Thus, as the host level timeout period changes either over time, or from host to host, the storage level retry maximum may be dynamically set, allowing the storage controller level number of retries to dynamically adjust as conditions change. In the illustrated embodiment, the storage level timeout period and the storage level retry maximum may be dynamically set to facilitate resolving conflicts over resources to avoid a deadlock condition and to facilitate completion of command execution prior to expiration of the host level timeout period and thus avoid a host level reset and retry.

Having dynamically set at least one of a timeout period and retry maximum as a function of the monitored duration of time, a command such as a point-in-time snap copy establish command, for example, may be received (block 320) by the storage controller. In response, the storage management of the storage controller may initiate execution of that command. In connection with execution of the command, priority over a first resource may be obtained (block 330) by the command, a storage controller level timer may be set (block 334) and an attempt (block 340) may be made to obtain priority for that command over a second resource associated with execution of the command. For example, in connection with receipt (block 320) of a point-in-time snap copy establish command, a timer may be set (block 334) for the duration of the dynamically set storage controller level timeout period determined in block 310. In addition, an attempt is made to obtain (block 340) priority over a second resource associated with the point-in-time snap copy establish command. Such a resource associated with the point-in-time snap copy establish command may be a particular storage extent range or task block, for example.

As used herein, a command or operation is considered to have priority over a resource such as a storage extent, for example, if the command or operation has obtained an extent block, which blocks access such as write update access to that storage extent. Another example of a command or operation having priority over a resource is if the command or operation has received a task lock, locking out other commands or operations from proceeding in connection with a resource such as a storage extent. Still another example of a command or operation having priority over a resource is if the command or operation has been placed in a queue ahead of another command or operation to receive the particular resource, such as an extent block or task lock, for example.

In the illustrated embodiment, a resource may be allocated to or acquired by a command, operation or other requestor using data structures such as task control blocks (TCBs). Thus, a TCB may be allocated to a resource such as a storage extent, for example. A request may be made to acquire the storage extent TCB. Return of the storage extent TCB to the requestor indicates that the particular storage extent has been allocated to the requestor, thereby blocking access to the storage extent by other commands or operations. Resources may be allocated using other techniques, depending upon the particular application.

Similarly, a TCB may be allocated to a timer function. The timer TCB may be placed on a timed queue for a particular duration of time. The timer TCB is returned to the requestor to signal to the requestor the expiration of the particular duration of time.

A determination is made as to whether the storage level timer has expired (block 350) and if not, a determination is made as to whether (block 360) the attempt to obtain priority over the second resource was successful. If so, the execution of the command may be completed (block 370).

Conversely, if priority over the second resource was not yet successfully obtained (block 360) the attempt to obtain priority over the second resource continues (block 340). If the storage level timer expires (block 350) prior to successfully obtaining priority over the second resource, it provides an indication of a potential deadlock condition. Accordingly, a determination (block 380) is made as to whether the dynamically set storage level retry maximum has been exceeded (block 380). If not, priority over a previously obtained first resource may be released (block 390) by the command. For example, if the point-in-time snap copy establish command had successfully obtained priority over a first resource such as a storage extent or a task lock, for example, priority over at least one of those resources may be released.

As explained in greater detail below, release of previously obtained priority over a first resource by a command for which the storage level timer had expired in connection an attempt to obtain priority over a second resource by the same command, may obviate a conflict with another command attempting to obtain priority over the first resource. Upon release (block 390) of the previously obtained priority over a first resource, priority of the command over the previously released resource may be reobtained (block 330). In addition, a timer may be set (block 334) for the duration of the dynamically set storage controller level timeout period determined in block 310. In addition, another attempt may be made to obtain (block 340) priority over a second resource associated with the point-in-time snap copy establish command. Between the time that the previously obtained priority over a first resource is released (block 390) and reacquired (block 330), another command seeking to obtain priority over the first resource may have successfully obtained priority over the first resource, competed its processing associated with the first resource and released the first resource. Still further, that command or another command may have competed its processing associated with the second resource and released the second resource. Thus, for one or more other commands, completion of processing associated with the second resource may have depended upon successful completion of processing associated with the first resource.

Upon release of the second resource by one or more other commands, the command received in block 320 may successfully obtain (block 360) priority over the second resource and complete execution (block 370) of the command. In this manner, conflict over the first and second resources may be reduced or avoided and deadlock avoided or resolved in an expeditious manner.

If the number of storage controller retries exceeds (block 380) the dynamically set storage controller level retry maximum, in one embodiment, the storage controller may end the I/O operation and request a retry (block 394) of the I/O operation to the host. For example, the storage controller can communicate to the host that there was a problem in connection with an I/O operation by ending a command with an ending status that includes a "unit check." In response, the host will end the I/O operation and issue a 'Sense' command to identify the cause of the problem. In this example, the storage controller may give a 'Redrive Immediate' sense which requests the host to redrive the chain of commands of the I/O operation again according to the ERP algorithms of the host. In one embodiment, the value of the storage controller level timeout period and the storage controller level retry maximum may be set to request the retry (block 394) t before the host level timeout period expires resulting in a reset. For example, if the host level timeout period is ten seconds, for example, and the storage level timeout period is two seconds, the storage level retry maximum may be set at three, for example, to limit the number of total retries to four for a total duration of eight seconds (four retries times two seconds for each retry) before a request retry message is sent to the host.

Figure 4A:
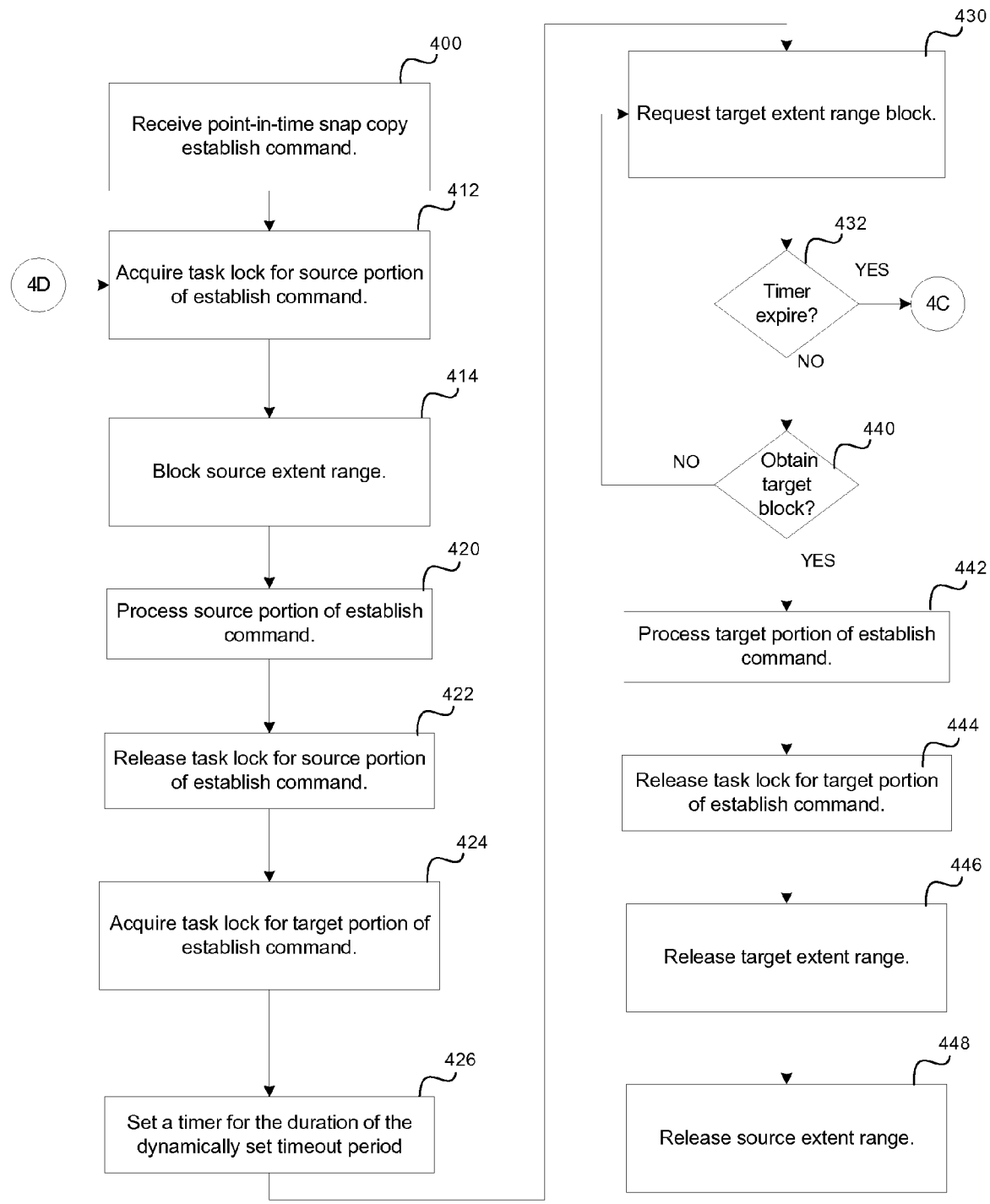
FIGS. 4a and 4b illustrate another an embodiment of operations of a point-in-time snap copy establish command utilizing data processing resource management in accordance with one embodiment of the present description.

FIGS. 4*a*. 4*b* illustrate an example of operations of storage management in connection with a point-in-time snap copy establish command such as a FlashCopy® command in which a conflict over resources is resolved in a manner which reduces or eliminates deadlock, allowing the establish command to complete. In a first operation, a storage controller such as the storage controller 104*a* (FIG. 1) for example, receives (block 400) from a host a command to establish a point-in-time snap copy relationship. The point-in-time snap copy establish command identifies the source storage locations and the target storage locations of the point-in-time snap copy relationship. In this example, the identified storage locations are identified as one or more extent ranges. In response, the storage management acquires (block 412) a point-in-time snap copy task lock for the source extent range, which locks out other point-in-time snap copy establish commands from establishing relationships involving the identified source extent range. In addition, the storage management blocks (414) other input/output operations from accessing the identified source extent range to write updates to those storage locations. However, read operations by other ongoing input/output operations of this or other hosts are permitted to read data from the identified source extent range.

Figure 5:
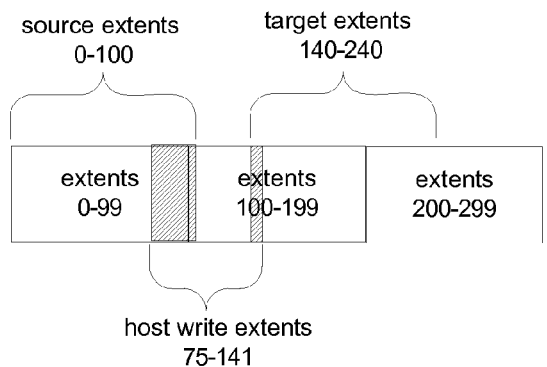
FIG. 5 illustrates an example of a host write command and a point-in-time snap copy establish command directed to overlapping extents in data storage.

For example, the point-in-time snap copy establish command may identify the source storage locations and the target storage locations of the point-in-time snap copy relationship as source extent range 0-100 and target extent range 140-240 as depicted in FIG. 5. Thus, after the source extent range 0-100 is blocked (block 414, FIG. 4a) for the point-in-time snap copy establish command, the storage controller may receive a write update command to write updates within storage extent range 75-141. As shown in FIG. 5, the host write extent range 75-141 overlaps both source extent range 0-100 and the target extent range 140-240 of the point-in-time snap copy establish command. Since the point-in-time snap copy establish command has blocked (block 414) the source extent range 0-100, the host write command seeking to write updates to storage extents 75-141 will be placed in a queue to await release of the block to source extents 0-100. Upon release of the block to source extents 0-100, the write update command will in turn seek to block access to the host write extents 75-141.

Having acquired the point-in-time snap copy task lock and write update block for the identified source extent range 0-100, the storage management 122a of the storage controller 104a processes (block 420) the source portion of the point-in-time snap copy establish command. For example, the storage management typically writes appropriate metadata to nonvolatile memory and examines appropriate bitmaps to maintain atomicity of the transactions. Upon completion of the source portion processing, the storage management releases (block 422) the point-in-time snap copy task lock allowing other point-in-time snap copy establish commands to establish relationships involving the identified source extent range.

In addition, the storage management acquires (block 424) a point-in-time snap copy task lock for the target extent range which blocks other point-in-time snap copy establish commands from establishing copy relationships in connection with the target extent range. A storage controller level timer may be set (block 426) and a request (block 430) is made to obtain a block to block access to the target extent range of the establish command. A determination is made as to whether the storage level timer has expired (block 432) and if not, a determination is made as to whether (block 440) the attempt to obtain the block of the target extent range was successful. If so, the execution of the command may be completed (blocks 442-448).

However, in this example, the write update command seeking to write updates within the extent range 75-141 has been placed in a queue to await release of the write update block to source extents 0-100. Because the write update range 75-141 also overlaps the target extent range 140-240 of the establish command, the establish command will be placed in a queue behind the write update command to await acquisition and subsequent release of a block on the write update range 75-141. Hence, acquisition of the target extents 140-240 by the establish command will be delayed until a block on the host write extents 75-141 is acquired and released by the write update command ahead of the establish command in the queue.)

Thus, in this example, the attempt (block 430) to obtain the block of the target extent range is not successful (block 440) because the write update command is ahead of the establish command in the queue, and the attempt to obtain the block of the target extent range continues (block 430). However, in this example, the write command is awaiting release of the source extents 0-100 by the establish command which is in turn waiting for the acquisition and release of the host write extents 75-141 by the write update command. Hence, a deadlock condition will be present and will continue in this example unless resolved.

Figure 4B:
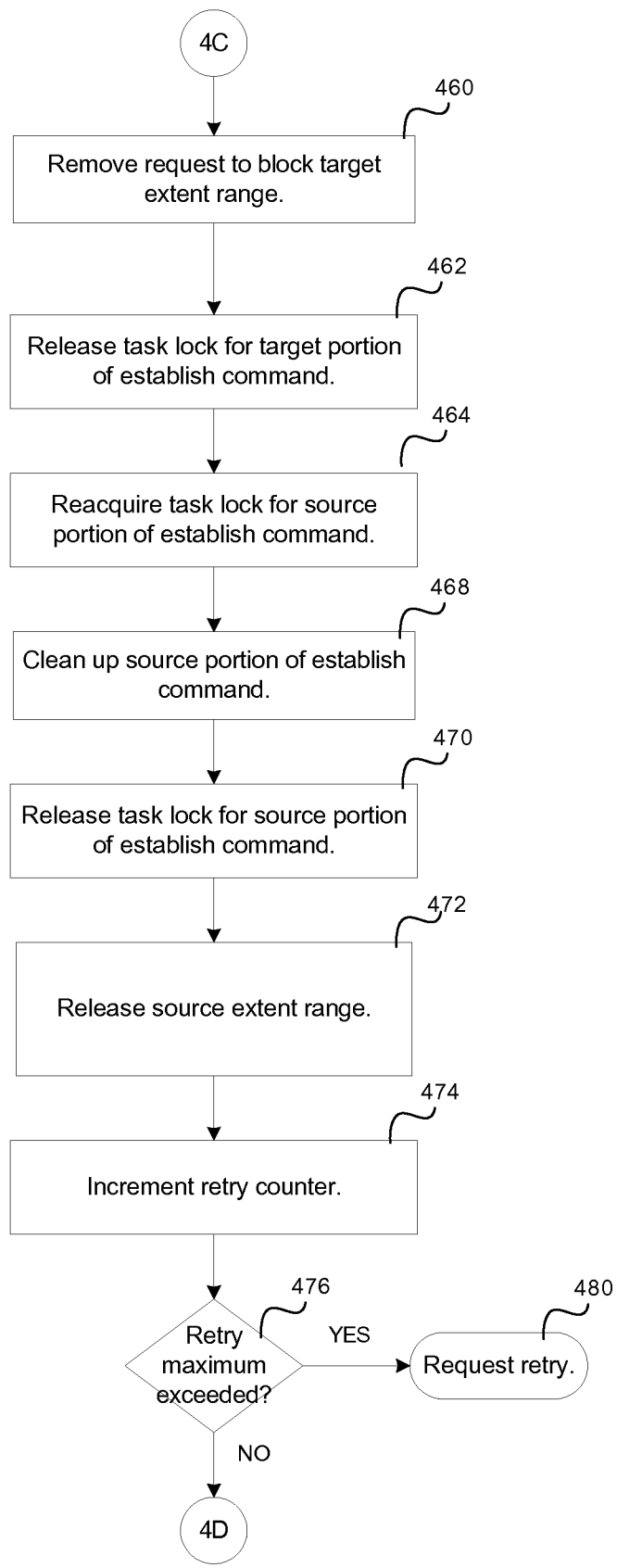

In accordance with one aspect of the present description, a potential deadlock condition is detected if the dynamically set storage level timer expires (block 432) prior to the establish command successfully obtaining priority over a second resource, which in this example, is the block to the target extents 140-240. Upon detection of the potential deadlock condition, the request to block the target extent range may be removed (block 460, FIG. 4b) from the queue and the previously obtained task lock for the target portion of the establish command may be released (block 462).

Further, the task lock for the source portion of the establish command may be reacquired (block 464) and the actions previously taken with respect to the source portion of the establish command may be cleaned up. For example, actions taken to set up the source extent range portion of the establish command may be undone. Upon completion of the cleanup of the source portion of the establish command, the previously obtained task lock for the source portion of the establish command may be released (block 470) and the previously obtained block of the source extent range 0-100 may be released (block 472).

As previously mentioned, in this example, the host write command seeking to write updates to storage extents 75-141 had been placed in a queue to await release of the block to source extents 0-100. Thus, upon release (block 472) of the block to the source extents 0-100, the write update command may be able to acquire the block to block access to the host write extents 75-141, complete the write updates, and release the block blocking access to the host write extents 75-141. If so, the write update command will be removed from the queue to request acquisition of the block to block access to the host write extents 75-141, thereby removing the deadlock condition. Hence, a limited number of retries of the establish command may be appropriate to verify whether the deadlock condition has been removed.

Accordingly, a storage controller level dynamically set retry counter may be incremented (block 474) and a determination (block 476) made as to whether the dynamically set retry maximum has been exceeded. If not, the establish command operations of blocks 412-440 may be repeated, beginning with reacquiring the task lock (block 412) for the source portion of the establish command and the block for the source extent range 0-100 (block 414) and culminating with the determination as to whether (block 440) the attempt to obtain the block of the target extent range 140-240 was successful. If so, a deadlock condition has been resolved by operations of blocks 460-472 including the prior release (block 472) of the previously obtained block of the source extent range 0-100, such that the execution of the establish command may proceed toward completion.

Accordingly, the target extent range 140-240 portion of the point-in-time snap copy establish command may be processed (block 442). Upon completion of the target portion of the establish command, the point-in-time snap copy task lock for the target portion of the point-in-time snap copy establish command may be released (block 444). In addition, the write update blocks on the target extent range 140-240 and the source extent range 0-100 may also be released (blocks 446, 448, respectively) since the establish command successfully completed execution.

If the storage level timer expires (block 432) again, it provides an indication that the potential deadlock condition has not yet been resolved. Accordingly, the cleanup and resource release operations of blocks 460-472 are repeated, the storage level retry counter is incremented (block 474) again and a determination is made (block 476) made as to whether the dynamically set retry maximum has been exceeded. If not, the establish command operations of blocks 412-440 may be repeated, culminating with the determination as to whether (block 440) the attempt to obtain the block of the target extent range 140-240 was successful. If it is determined (block 476) that the dynamically set retry maximum has been exceeded, the retry counter may be reset and a request to retry message may be returned (block 480) to the host, indicating that a retry of the establish command may be tried later.

It is noted that due to the cleanup operation and resource releases of block 460-472, a reset of the establish command by the host may be obviated in some embodiments. It is appreciated that other features may be realized instead of or in addition to those described herein, depending upon the particular application.

In the illustrated embodiment, the storage controller level retry counter may be reset at a suitable point in the execution of a command by the storage controller. For example, in some embodiments, the retry counter may be reset upon successful completion of a command, upon return of a request to retry message to the host, upon successful acquisition of a resource or at another point in the execution of a command, depending upon the particular application.

Figure 6:
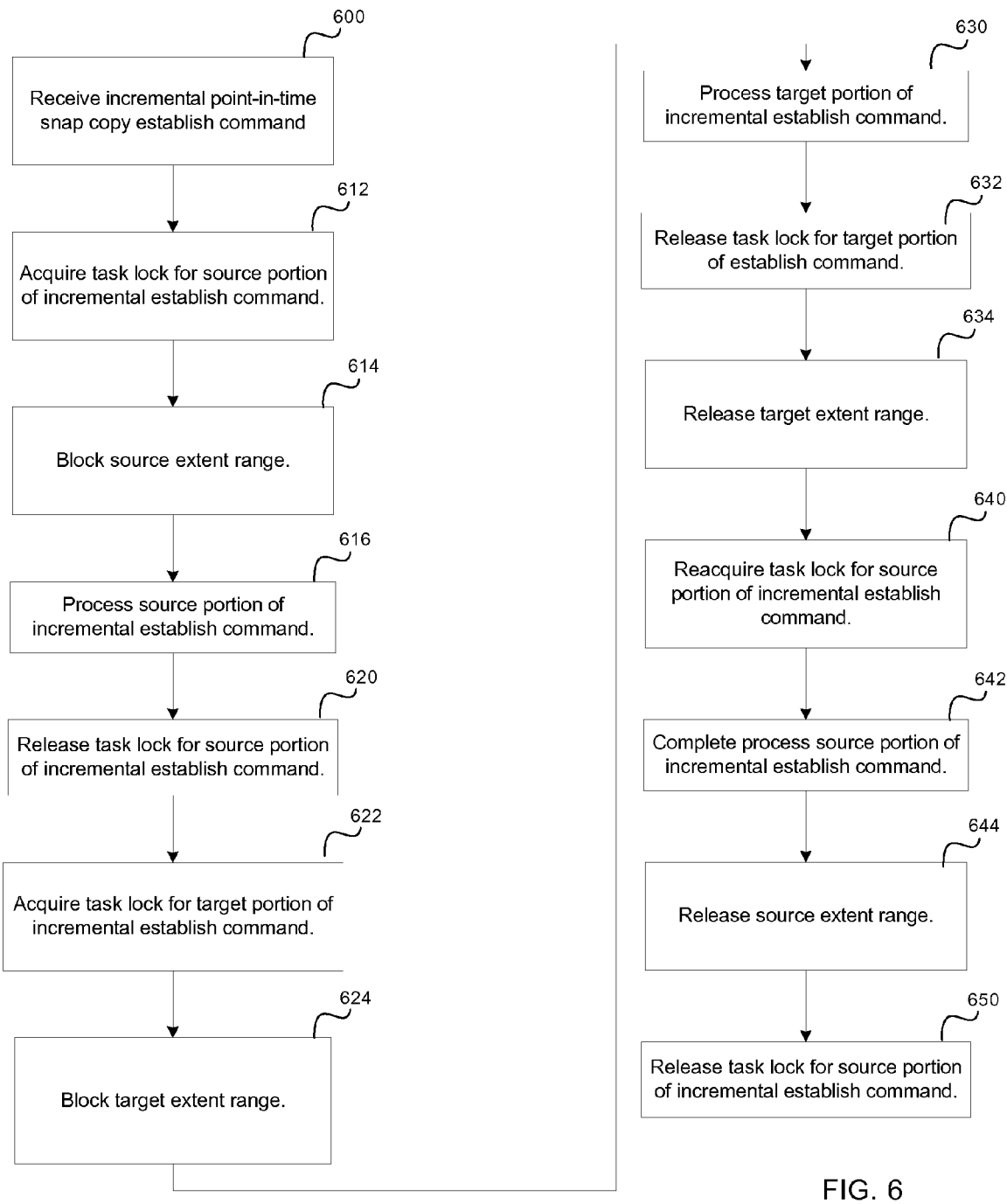
FIG. 6 illustrates an example of prior operations of an incremental point-in-time snap copy establish command.
Figure 9A:
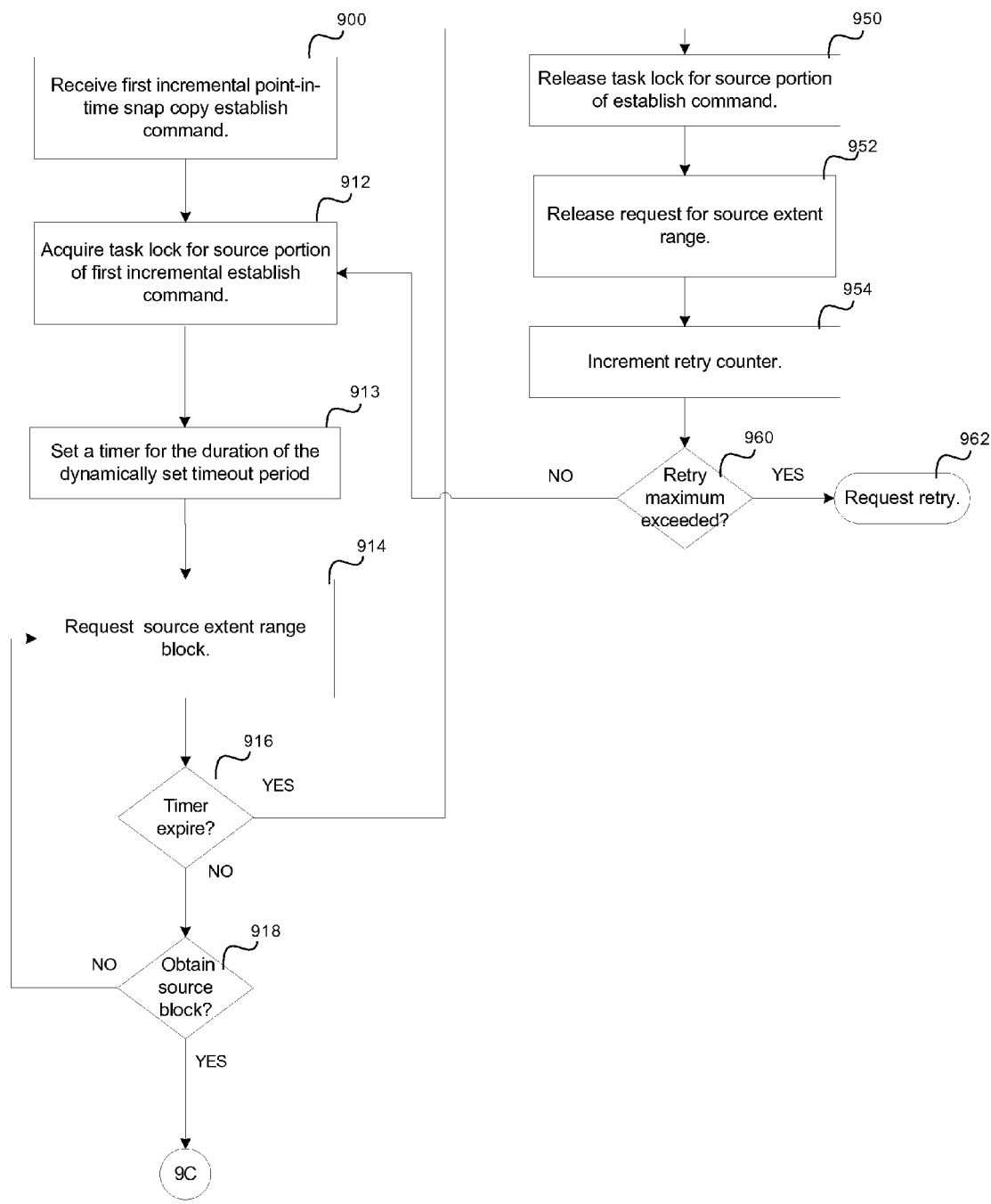
FIGS. 9a and 9b illustrate an embodiment of operations of an incremental point-in-time snap copy establish command utilizing data processing resource management in accordance with one embodiment of the present description.
Figure 9B:
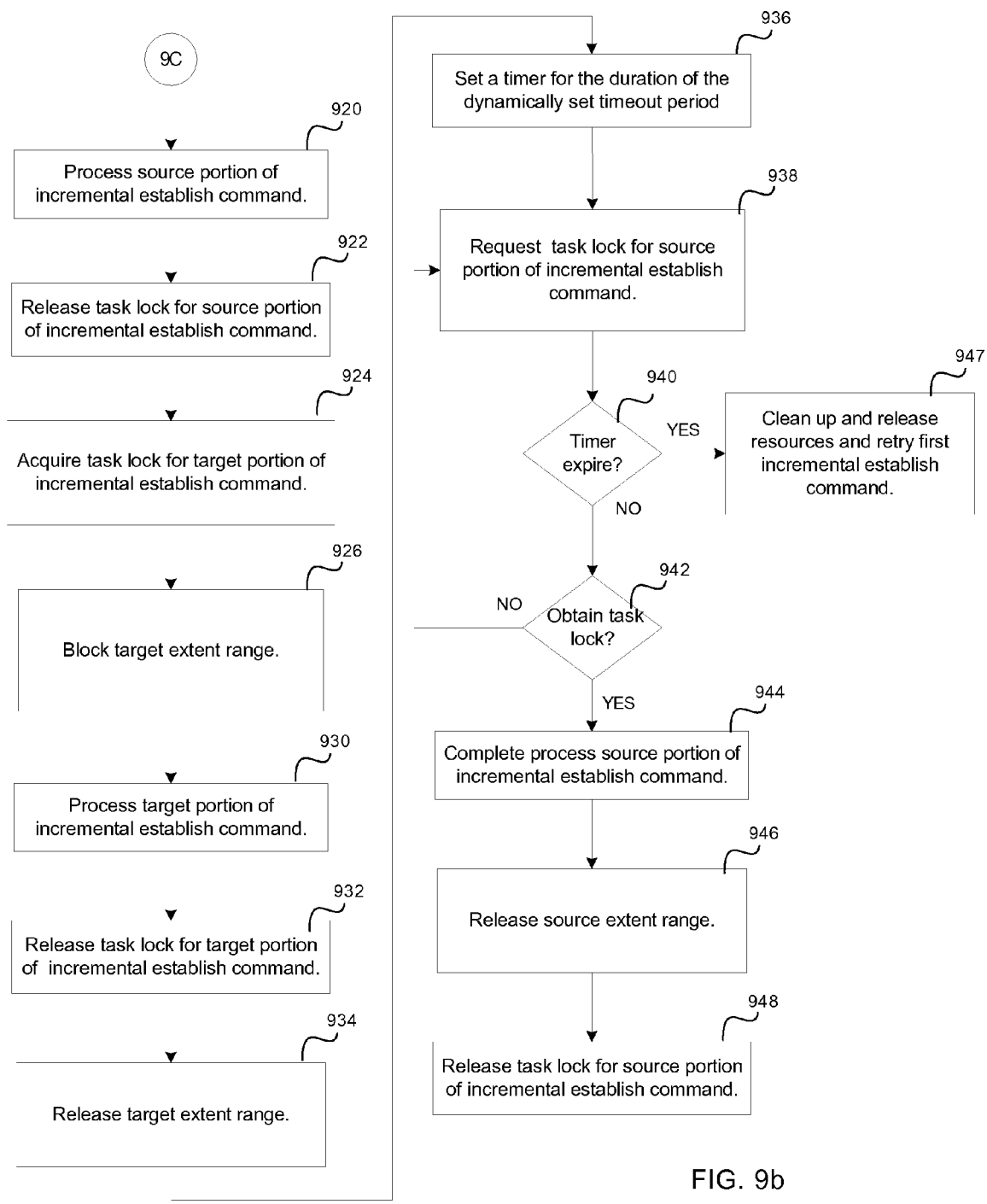
Figure 10A:
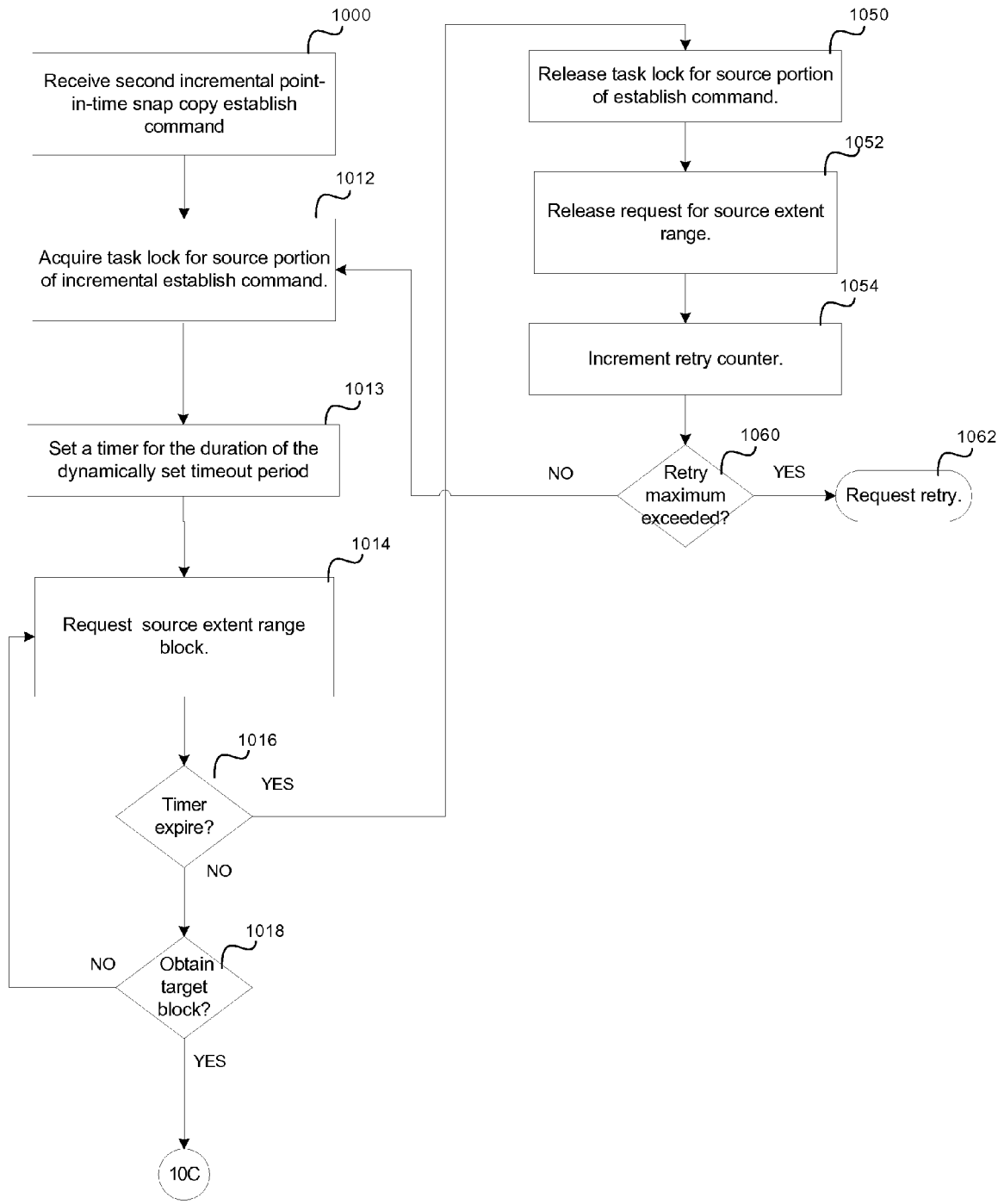
FIGS. 10a and 10b illustrate another embodiment of operations of an incremental point-in-time snap copy establish command utilizing data processing resource management in accordance with one embodiment of the present description.
Figure 10B:
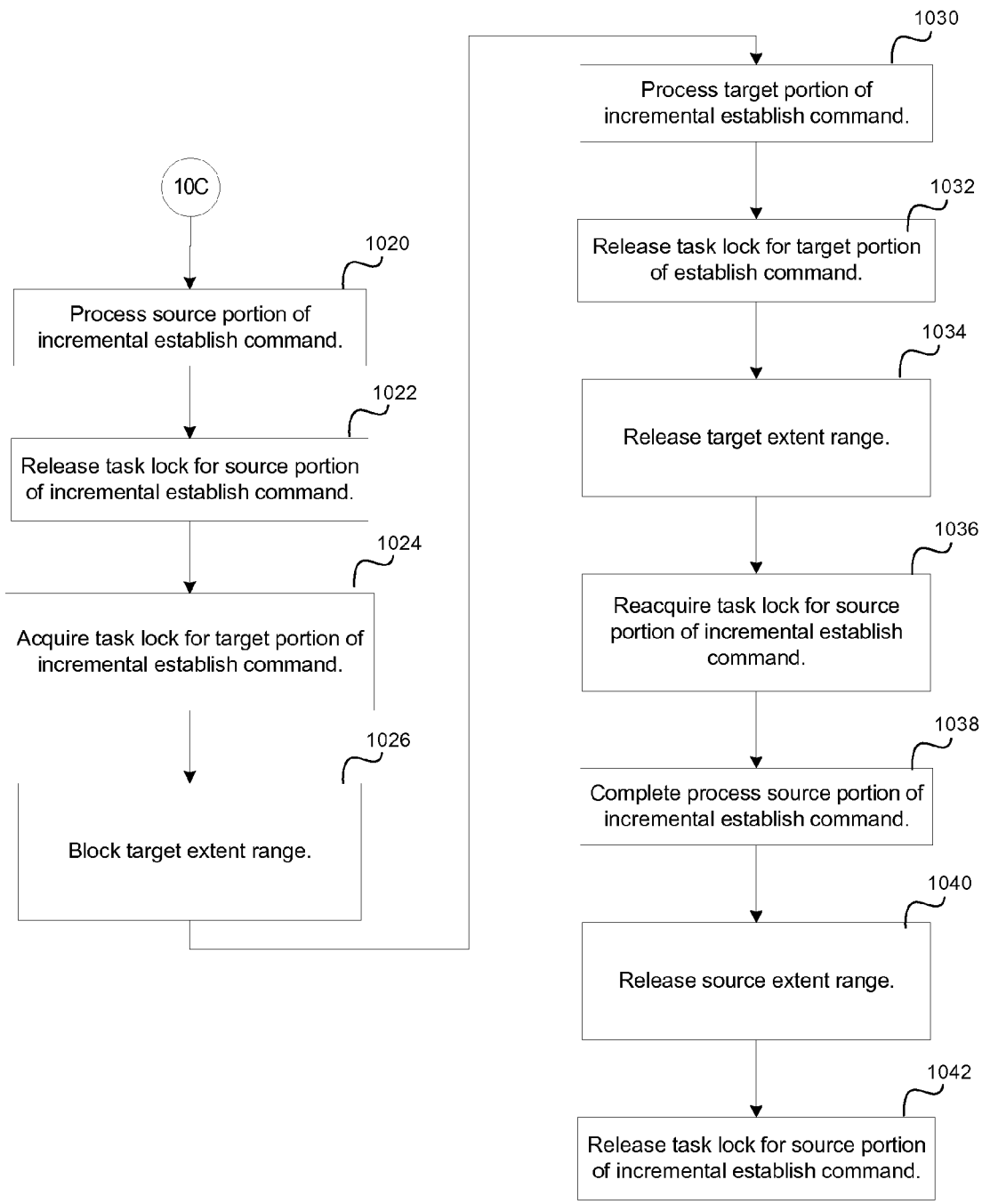

FIG. 6 provides another example of a command which may lead to a conflict over resources which may lead to a deadlock condition. The example of FIG. 6 illustrates operations of a previous incremental point-in-time snap copy establish command such as an incremental FlashCopy® command which in this example, proceeded without a conflict over resources. In a first operation, a storage controller receives (block 600) from a host a command to establish an incremental point-in-time snap copy relationship. The incremental point-in-time snap copy establish command identifies the source storage locations and the target storage locations of the point-in-time snap copy relationship. In this example, the identified storage locations are identified as one or more extent ranges. In response, the storage management acquires (block 612) a point-in-time snap copy task lock for the source extent range, which blocks other point-in-time snap copy establish commands from establishing relationships involving the identified source extent range. In addition, the storage management blocks (614) other input/output operations from accessing the identified source extent range to write updates to those storage locations. However, read operations by other ongoing input/output operations of this or other hosts are permitted to read data from the identified source extent range.

Have acquired the point-in-time snap copy task lock and write update block for the identified source extent range, the storage management processes (block 616) the source portion of the incremental point-in-time snap copy establish command. For example, the storage management typically writes appropriate metadata to nonvolatile memory and examines appropriate bitmaps to maintain atomicity of the transactions. Upon completion of the source portion processing, the storage management releases (block 620) the point-in-time snap copy task lock allowing other point-in-time snap copy establish commands to establish relationships involving the identified source extent range.

In addition, the storage management acquires (block 622) a point-in-time snap copy task lock for the target extent range which blocks other point-in-time snap copy establish commands from establishing copy relationships in connection with the target extent range. In addition, the storage management blocks (624) other input/output operations from accessing the identified target extent range to write updates to those storage locations. However, read operations are permitted to read data from the identified extent range.

Have acquired the point-in-time snap copy task lock and write update block for the identified target extent range, the storage management processes (block 630) the target portion of the point-in-time snap copy establish command. Here too, the storage management writes appropriate metadata to nonvolatile memory and examines appropriate bitmaps to maintain atomicity of the transactions.

Upon completion of the target portion processing, the storage management releases the point-in-time snap copy task lock (block 632) allowing other point-in-time snap copy establish commands to establish relationships involving the identified target extent range, and releases the block of the target extent range (block 634). Accordingly, other input/output operations may access the identified target extent range to write updates as appropriate.

At this point, the storage management reacquires (block 640) a point-in-time snap copy task lock for the source extent range, which blocks other point-in-time snap copy establish commands from establishing relationships involving the identified source extent range. Having reacquired (block 640) the point-in-time snap copy task lock and retained the previously acquired (block 614) write update block for the identified source extent range, the storage management completes the processing (block 642) for the source portion of the incremental point-in-time snap copy establish command. Upon completion of the source portion processing, the storage management releases (block 644) the block of the source extent range, allowing other input/output operations to access the identified source extent range to write updates as appropriate. In addition, the point-in-time snap copy task lock is released (block 650) allowing other point-in-time snap copy establish commands to establish relationships involving the identified source extent range. At this point, execution of the incremental point-in-time snap copy command is complete, having established an incremental point-in-time snap copy relationship between the identified source extent range and the identified target extent range, and released the resources utilized in establishing the relationship.

In accordance with the present description, it is recognized that overlapping execution of various commands including an incremental point-in-time snap copy establish command, may lead to a conflict over resources which may lead to a deadlock condition. The table of FIG. 7 depicts an example of such overlapping execution of various commands including an incremental point-in-time snap copy establish command leading to a deadlock condition, which, in accordance with one aspect of the present description, may be resolved prior to a host reset as depicted in the table of FIG. 8, using storage management in accordance with the present description.

The table of FIG. 7 depicts various operations of the execution of overlapping commands including an incremental point-in-time snap copy establish command, referred to therein as "Task A," a host write update command referred to therein as "Task B," and a second incremental point-in-time snap copy establish command, referred to therein as "Task C." Absent a conflict over resources, the execution of the operations of Task A would correspond to blocks 600-650 of FIG. 6, depicting operations for a typical incremental point-in-time snap copy establish command. In a similar manner, absent a conflict over resources, the execution of the operations of Task C would also correspond to blocks 600-650 of FIG. 6, depicting operations for a typical incremental point-in-time snap copy establish command. In this example, the initial portion of the execution of the operations of Task A correspond to blocks 600-630 for the point-in-time snap copy establish command of FIG. 6. However, as the target portion of the incremental establish command is being processed by Task A, the host write update command (Task B) is also received by the storage controller. In this example, the host write extent is the same as or overlaps with the source extent range of Task A, the first incremental establish command. Accordingly, as depicted in the table of FIG. 7, Task B, the host write update command, when attempting to obtain a block for the host write extent, is placed in a queue to await release of the block acquired by Task A, the first incremental establish command, blocking access to the source extent of the first incremental establish command, Task A.

In this example, the storage controller receives (in a manner similar to block 600, FIG. 6, for Task A) the second incremental point-in-time snap copy establish command (Task C) which identifies a source extent range which is the same as or overlapping that of the first incremental point-in-time snap copy establish command, Task A. Accordingly, the second incremental point-in-time snap copy establish command, Task C, acquires (in a manner similar to block 612 for Task A) a point-in-time snap copy task lock for the source extent. In this example, at this point, Task A had previously released (block 620, FIG. 6) the previously acquired (block 612, FIG. 6) point-in-time snap copy task lock, permitting the task lock to be acquired by Task C.

In addition, the second incremental point-in-time snap copy establish command, Task C, requests (in a manner similar to block 614 for Task A) a block for the source extent. However, as depicted in the table of FIG. 7, Task C, the second incremental point-in-time snap copy establish command, when attempting to obtain a block for the source extent, is placed in a queue to await release of the block previously requested by Task B, the host write update command, which in turn is awaiting release of the source extent block acquired by Task A, the first incremental establish command, blocking access by both Task B and Task C, to the source extent of the first incremental establish command, Task A.

Task A, the first incremental establish command continues to execute releasing (block 632) the previously acquired (block 622) task lock for the target portion of the first incremental establish command, releases (block 634) the target extent range for the first incremental establish command (Task A) and requests to reacquire (block 640)) the point-in-time snap copy task lock for the source extent. However, as depicted in the table of FIG. 7, the second incremental establish command, Task C, at that point holds the task lock for the source extent, thereby preventing Task A from reacquiring the task lock for the source extent. Accordingly, Task A is placed in a queue awaiting release of the task lock held by Task C for the source extent. In this manner, Task A is prevented from completing the source extent processing of block 642 until Task C releases the task lock for the source extent. Task C is prevented from processing the source extent portion of the incremental establish command and releasing the task lock for the source extent until the block for the source extent is first released by Task A and then released by Task B which are in the queue head of Task A. Task B is prevented from processing the write updates to the source extent until the block to the source extent is released by Task A. In this manner, a deadlock condition exists.

The table of FIG. 8 and FIGS. 9a-9b, 10a-10b depict storage management operations in accordance with one aspect of the present description in which resolution of such a deadlock condition may be facilitated, in a manner which reduces or eliminates command reset and retry at the host level. Here too, the table of FIG. 8 depicts various operations of the execution of a first incremental point-in-time snap copy establish command, referred to therein as "Task D." The initial portion of the execution of the operations of Task D corresponds to blocks 900-930 (FIGS. 9a, 9b) for a point-in-time snap copy establish command. In executing Task D, the task lock for the source portion of the incremental establish command is acquired (block 912) for Task D, the block for the source extent is requested and obtained (blocks 914-918) for Task D. (Should the dynamically set timer (block 916) expire in the attempt to obtain the source extent block for Task D, operations of blocks 950-962 may be performed in a manner similar to the operations of blocks 470-480 described above.) In addition, the source portion of the incremental establish command is processed (block 920, FIG. 9b) for Task D, the task lock for the source portion of the incremental establish command is released (block 922) for Task D, the task lock for the target portion of the incremental establish command is acquired (block 924) for Task D and the target extent block is requested and obtained (block 926) for Task D. However, as the target portion of the incremental establish command is being processed (corresponding to block 930, FIG. 9b) by Task D, a host write update command (referred to herein as "Task E") is also received by the storage controller as shown in the table of FIG. 8. In this example, the host write extent is the same as or overlaps with the source extent range of Task D, the first incremental establish command. Accordingly, as depicted in the table of FIG. 8, Task E, the host write update command, when requesting a block for the source extent, is placed in a queue to await release of the source extent block acquired (block 926) by Task D, the first incremental establish command, blocking access by the host write command (Task E) to write updates to the source extent of the first incremental establish command, Task D.

In this example, the storage controller receives (block 1000, FIG. 10a) a second incremental point-in-time snap copy establish command, referred to in the table of FIG. 8 as "Task F," which identifies a source extent range which is the same as or overlapping that of the first incremental point-in-time snap copy establish command, Task D. Accordingly, the second incremental point-in-time snap copy establish command, Task F, acquires (block 1012, FIG. 10a) a point-in-time snap copy task lock for the source extent as shown in the table of FIG. 8. In this example, at this point, Task D had previously released (block 922, FIG. 9b) the previously acquired (block 912, FIG. 9a) point-in-time snap copy task lock, permitting the task lock to be acquired by Task F as shown in the table of FIG. 8.

In addition, the second incremental point-in-time snap copy establish command, Task F, requests (blocks 1013-1018) a block for the source extent. However, as depicted in the table of FIG. 8, Task F, the second incremental point-in-time snap copy establish command, when attempting to obtain a block for the source extent, is placed in a queue to await release of the block previously requested by Task E, the host write update command, which in turn is awaiting release of the source extent block acquired (block 918) by Task D, the first incremental establish command, thereby blocking access by both Task E and Task F, to the source extent of the first incremental establish command, Task D.

In accordance with one aspect of the present description, a timer is set (block 1013, FIG. 10*a*) for the duration of the timeout period which has been dynamically set for the host of Task F. The timer may be started before, during or after Task F, the second incremental establish command, requests (block 1014) the source extent range block, for example.

In this example, as the timer set (block 1013) by Task F continues to run, Task D, the first incremental establish command continues to execute, releasing (block 932, FIG. 9*b*) the previously acquired (block 924) task lock for the target portion of the first incremental establish command (Task D), releasing (block 934) the target extent range for the first incremental establish command (Task D) and seeking to reacquire (blocks 936-942) the point-in-time snap copy task lock for the source extent. However, as depicted in the table of FIG. 8, the second incremental establish command, Task F, at that point holds the task lock for the source extent, thereby preventing Task D from reacquiring the task lock for the source extent. Accordingly, Task D is placed in a queue awaiting release of the task lock held by Task F for the source extent. In this manner, Task D is prevented from completing the source extent processing of block 944 until Task F releases the task lock for the source extent. Task F is prevented from processing the source extent and releasing the task lock for the source extent until the block for the source extent is first released by Task D and then released by Task E which are in the queue head of Task D. Task E is prevented from processing the write updates to the source extent until the block to the source extent is released by Task D. In this manner, a deadlock condition exists.

In the illustrated embodiment, a timer is set (block 936, FIG. 9*b*) for the duration of the timeout period which has been dynamically set for the host of Task D. As Task D awaits release of the task lock held by Task F for the source extent, the timer is periodically checked (block 940) to determine if the dynamically set timer has expired. If not, and if the task lock has not yet been acquired, the request (block 938) for the task lock continues.

In a similar manner, As Task F awaits release of the source extent block held by Task D for the source extent, the timer for Task F is periodically checked (block 1016, FIG. 10*a*) to determine if the dynamically set timer has expired. If not, and if the source extent block has not yet been acquired, the request (block 1014) for the source extent block continues. Due to the deadlock condition of this example, the timer will expire (block 1016) prior to Task F acquiring the source extent block. In this manner, the deadlock condition may be detected.

Upon detection of the potential deadlock condition, resources previously acquired by Task F may be released and Task F may be retried. Accordingly, the previously obtained task lock for the source portion of the incremental establish command Task F may be released (block 1050) and the request to block the source extent range may be released (block 1052), removing the source extent range block request from the queue.

As previously mentioned, in this example, Task D awaits (blocks 938-942, FIG. 9*b*) release of the task lock held by Task F for the source extent. Upon release (block 1050, FIG. 10*a*) by the second incremental establish command (Task F) of the task lock for the source portion of the incremental establish command, Task D may acquire (block 942, FIG. 9*b*) the task lock as shown in the table of FIG. 8. Accordingly, Task D may complete (block 944) the processing of the source portion of the incremental establish command (Task D) and release (block 946) the source extent range. In this manner, the deadlock condition is resolved. Should the timer expire (block 940), Task D cleans up (block 947) the previously performed source and target extent processing of the incremental establish command, releases the previously acquired resources and retries the incremental establish command if the retry maximum has not been exceeded.

As previously mentioned, in this example, the request by the host write command (Task E) for the source extent block to permit it to write updates to source extents had been placed in a queue to await release of the block to source extents. Thus, upon release (block 946) of the source extent range by Task D, the write update command (Task E) is permitted to acquire the source extent block as shown in the table of FIG. 8, to block access to the source extents by other commands, permitting the host write update command to complete the write updates, and release the source extent block blocking access to the source extents.

The first incremental establish command (Task D) continues to execute and releases (block 948, FIG. 9*b*) the task lock for the source portion of the incremental establish command, as shown in the table of FIG. 8. In this manner, the first incremental establish command (Task D) is permitted to complete upon resolution of the deadlock condition.

Similarly, the second incremental establish command (Task F) continues to execute. Thus, after the request to block the source extent range is released (block 1052, FIG. 10*a*), removing the source extent range block request from the queue, Task F may be retried. Accordingly, a storage controller level retry counter may be incremented (block 1054) and a determination (block 1060) made as to whether the dynamically set retry maximum has been exceeded. If it is determined (block 1060) that the dynamically set retry maximum has been exceeded, the retry counter may be reset and a request to retry message may be returned (block 1062) to the host, indicating that a retry of the establish command may be tried later. If the dynamically set retry maximum has not been exceeded, the incremental establish command operations of blocks 1012-1018 may be repeated, beginning with reacquiring the task lock (block 1012) for the source portion of the incremental establish command, setting (block 1013) the timer for the duration of the dynamically set timeout period for the host issuing Task F, requesting (block 1014) the source extent block for the source extent range of the second incremental establish command (Task F), and culminating with the determination as to whether (block 1018) the request to obtain the source extent block was successful. As previously mentioned, resolving the deadlock condition permitted the source extent block to be released by Task D, and acquired and released by Task E. Accordingly, the second incremental establish command (Task F) will be permitted to obtain (block 1018) the source extent block.

Thus, by resolving the deadlock condition, the execution of the second incremental establish command (Task F) may proceed toward completion. Accordingly, the source portion of the second incremental establish command (Task F) is processed (block 1020, FIG. 10*b*) for Task F, the task lock for the source portion of the second incremental establish command (Task F) is released (block 1022) for Task F, the task lock for the target portion of the second incremental establish command (Task F) is acquired (block 1024) for Task F and the target extent block is requested and obtained (block 1026) for Task F. Still further, the target portion of the second incremental establish command (Task F) is processed (block 1030).

Task F, the second incremental establish command continues to execute, releasing (block 1032, FIG. 10b) the previously acquired (block 1024) task lock for the target portion of the second incremental establish command (Task F), releasing (block 1034) the target extent range for the second incremental establish command (Task F) and reacquiring (block 1036) the point-in-time snap copy task lock for the source extent.

Task F may complete (block 1038) the processing of the source portion of the second incremental establish command (Task F) and releases (block 1040) the source extent range. The second incremental establish command (Task F) continues to execute and releases (block 1042, FIG. 10b) the task lock for the source portion of the second incremental establish command. In this manner, the second incremental establish command (Task F) as well as the first incremental establish command (Task D) and the host write operation (Task E) are each permitted to complete upon resolution of the deadlock condition.

In the examples of FIGS. 9a, 9b, 10a, 10c, a timer is shown to be set for a dynamically determined period of time in connection with a request to obtain a source extent range block and a timer is shown to be set for a dynamically determined period of time in connection with a request to obtain a task lock for the source portion of an incremental establish command. It is appreciated however that a timer may be set for a dynamically determined period of time in connection with a request to obtain other resources such as for example, target range extents, and task blocks for target portions of the command. Similarly, a retry maximum may be set and checked for requests for other resources, depending upon the particular application.

Furthermore, the illustrated embodiment has been described in connection with a dynamically set duration of time for a storage controller level timeout period and a dynamically set retry maximum. It is appreciated that in other embodiments a timeout period or a retry maximum may be fixed to a predetermined level or may be determined in a look up table for example, depending upon the particular application.

Still further, it is appreciated that resource management in accordance with the present description may be applied to a variety of resources other than extent range blocks and task locks. For example, resources such as metadata locks and memory reserves may also be in demand by competing commands or operations leading to a potential deadlock condition. Moreover, it is appreciated that the various operations described herein may be performed in a different order, that other operations may be added and that selected operations may be modified or omitted. For example, in some embodiments, some resources or some relationships may be retained rather than released in preparation for a retry. Other resources or relationships may be maintained by a quick release and immediate reobtaining of that resource, depending upon the particular application.

Figure 11:
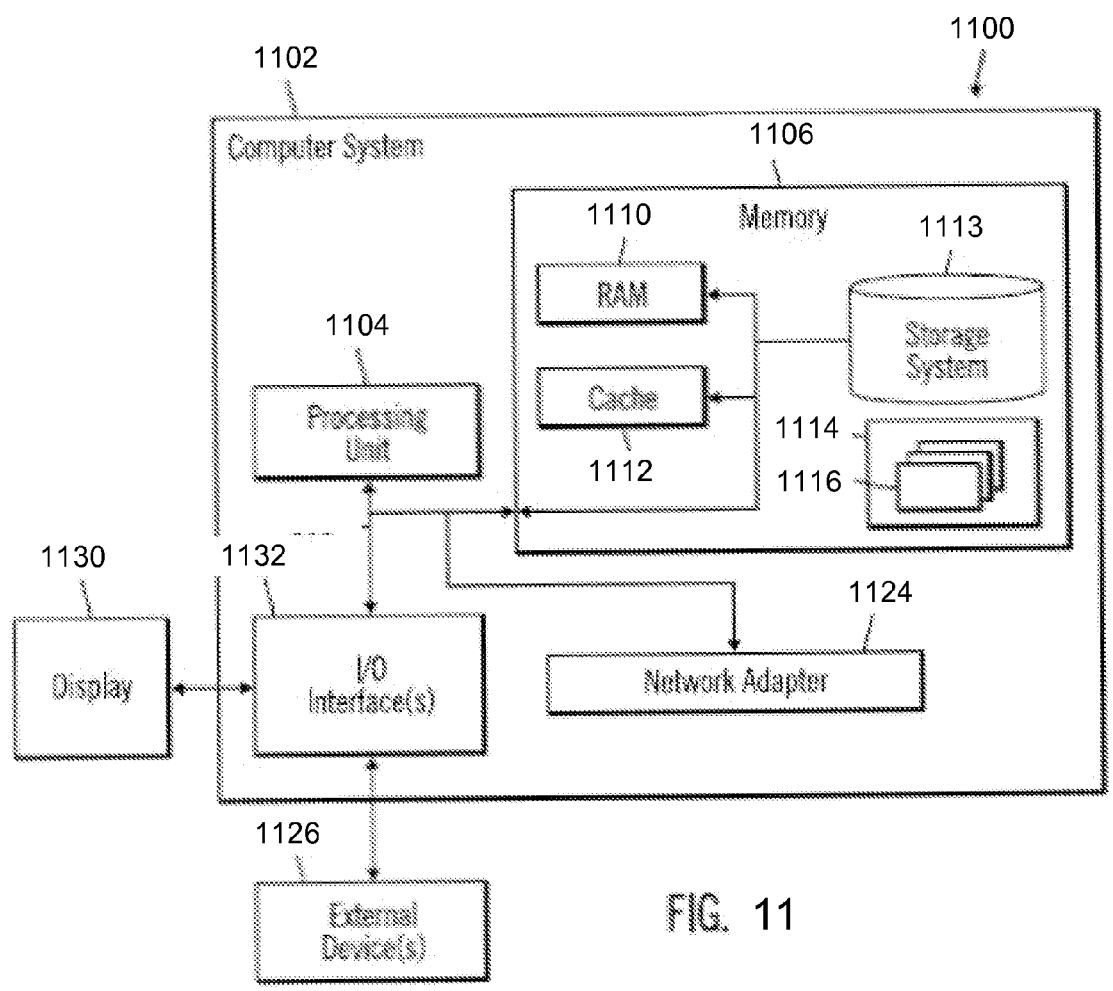
FIG. 11 illustrates one node of a network computing environment, employing data processing resource management in accordance with one embodiment of the present description.

FIG. 11 illustrates one embodiment of a node 1100 of a distributed computing system such a host, application server, storage controller, server or virtual server, of the storage area network 102 of FIG. 2. However, it is appreciated that the node 1100 of FIG. 11 may comprise any suitable computing device 1102, such as a mainframe, server, personal computer, laptop, handheld computer, telephony device, network appliance, virtualization device, storage controller, failover lock device, embedded device, etc.

It is appreciated that the nodes of a distributed computing system may perform a variety of data processing functions such as data storage and management in disk arrays, for example. Thus, the node of FIG. 11 may perform data processing tasks such as data backup, data deduplication, data mining data capture, data archiving, data replication, bandwidth reduced data replication, encryption of data, etc. and typically involve the transfer of large amounts of data between the hosts 114 and storage 106a, 106b (FIG. 2).

The node 1100 may perform data processing resource management in accordance with one or more embodiments described herein.

The node may include a processor 1104 (e.g., a microprocessor), a memory 1106 (e.g., a volatile memory device 1110), cache 1112, and storage 1113 (e.g., a non-volatile storage, such as magnetic disk drives, optical disk drives, a tape drive, flash storage etc.). A storage 1114 may comprise an internal storage device or an attached or network accessible storage. Programs 1116 in the storage 1114 are loaded into the memory 1110 and executed by the processor 1104 as represented by an operating system and data processing programs 1116.

Programs 1116 are also provided in the memory 1114 for data processing resource management in accordance with the present description.

The node further includes a network controller or adapter 1124 to enable communication with a network such as an Ethernet, a Fibre Channel Arbitrated Loop, etc. which interconnects the nodes of the distributed computing system. The network controller or adapter 1124 may also enable communication with a network path to a host 14 or communication with a network path to storage 6.

User input devices 1126 provide user input to the processor 1104, and may include a keyboard, mouse, pen-stylus, microphone, touch sensitive display screen, or any other suitable activation or input mechanism. Output devices 1130 are capable of rendering information transmitted from the processor 1104, or other component, such as a display monitor, printer, storage, etc. The input devices 1126, and output devices 1130 may be coupled directly to a node using a suitable KVM (keyboard, video, mouse) switch or other I/O interface 1132 in some applications.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, an application specific integrated circuit (ASIC), a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present description may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present description are described above with reference to flowchart illustrations and/or block diagrams of methods, apparatus (systems) and computer program products according to embodiments of the description. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present description(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present description.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present description need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the description has been presented for the purposes of illustration and description. It is not intended to be exhaustive or to limit the description to the precise form disclosed. Many modifications and variations are possible in light of the above teaching. It is intended that the scope of the description be limited not by this detailed description, but rather by the claims appended hereto. The above specification, examples and data provide a complete description of the manufacture and use of the composition of the description. Since many embodiments of the description may be made without departing from the spirit and scope of the description, the invention resides in the claims herein after appended.

What is claimed is:

1. A method, comprising:
    monitoring the duration of time between receipt of a first command from a command initiator and receipt of a second command from said command initiator and associated with said first command;
    dynamically setting a timeout period as a function of said monitored duration of time;
    receiving a plurality of additional commands including a third command from said command initiator and partially executing said plurality of additional commands wherein partially executing the third command includes setting a timer for the duration of said dynamically set timeout period and obtaining priority over a first resource which is also associated with execution of a command of said plurality of additional commands other than said third command;
    detecting a deadlock condition as a function of expiration of said dynamically set timeout period before execution of the third command is completed, wherein the deadlock condition results from completion of execution of the third command being blocked by another command of said plurality of additional commands having obtained priority over a second resource which is also associated with execution of the third command;
    releasing priority of the third command over the first resource upon detection of said deadlock condition; and
    reobtaining priority of the third command over the first resource.

2. The method of claim 1 further comprising:
    dynamically setting a maximum number of command retries as a function of said monitored duration of time; and
    retrying execution of the third command up to the dynamically set maximum number of command retries.

3. The method of claim 1 wherein the first command is in a chain of commands of an input/output operation issued by a host to a storage controller and wherein the second command is a reset command issued by the host in response to a missing interrupt handler upon expiration of a predetermined time period.

4. The method of claim 1 wherein the first resource is a task lock for a class of input/output operations executed by a storage controller in response to a command from a host.

5. The method of claim 4 wherein the second resource is a range of storage locations in a storage subsystem which includes storage and a storage controller.

6. The method of claim 1 wherein the third command is an establish point-in-time snap copy command associated with the first resource which includes a source storage extent and a target storage extent and wherein an additional command is a write command to write data to an extent overlapping said source storage extend and said target storage extent.

7. The method of claim 1 wherein the third command is a first incremental establish point-in-time snap copy command associated with the first resource which includes a source storage extent and a target storage extent and wherein an additional command is a write command to write data to an extent overlapping said source storage extent, and wherein an additional command is a second incremental establish point-in-time snap copy command associated with a source storage extent which overlaps with said source storage extent of the first incremental establish point-in-time snap copy command.

8. A system for use with a host having a command initiator, comprising:
    at least one storage subsystem including at least one storage unit and at least one storage controller adapted to access and control storage units of the at least one storage subsystem wherein the storage subsystem includes a plurality of resources and a timer; and
    at least one non-transitory computer readable storage medium having computer readable program code embodied therein that is enabled to cause operations to be performed, the operations comprising:
    monitoring the duration of time between receipt of a first command from a command initiator and receipt of a second command from said command initiator and associated with said first command;
    dynamically setting a timeout period as a function of said monitored duration of time;
    receiving a plurality of additional commands including a third command from said command initiator and partially executing said plurality of additional commands wherein partially executing the third command includes setting a timer for the duration of said dynamically set timeout period and obtaining priority over a first resource which is also associated with execution of a command of said plurality of additional commands other than said third command;
    detecting a deadlock condition as a function of expiration of said dynamically set timeout period before execution of the third command is completed, wherein the deadlock condition results from completion of execution of the third command being blocked by another command of said plurality of additional commands having obtained priority over a second resource which is also associated with execution of the third command;
    releasing priority of the third command over the first resource upon detection of said deadlock condition; and
    reobtaining priority of the third command over the first resource.

9. The system of claim 8 wherein the operations further comprise:
    dynamically setting a maximum number of command retries as a function of said monitored duration of time; and
    retrying execution of the third command up to the dynamically set maximum number of command retries.

10. The system of claim 8 wherein the first command is a command of a chain of commands of an input/output operation issued by a host to a storage controller and wherein the second command is a reset command issued by the host in response to a missing interrupt handler upon expiration of a predetermined time period.

11. The system of claim 8 wherein the first resource is a task lock for a class of input/output operations executed by a storage controller in response to a command from a host.

12. The system of claim 11 wherein the second resource is a range of storage locations in a storage unit of the storage subsystem.

13. The system of claim 8 wherein the third command is an establish point-in-time snap copy command associated with the first resource which includes a source storage extent and a target storage extent and wherein an additional command is a write command to write data to an extent overlapping said source storage extend and said target storage extent.

14. The system of claim 8 wherein the third command is a first incremental establish point-in-time snap copy command associated with the first resource which includes a source storage extent and a target storage extent and wherein an additional command is a write command to write data to an extent overlapping said source storage extent, and wherein an additional command is a second incremental establish point-in-time snap copy command associated with a source storage extent which overlaps with said source storage extent of the first incremental establish point-in-time snap copy command.

15. A computer program product for use with a host having a command initiator, and for managing data storage operations in connection with at least one storage subsystem including at least one storage unit and at least one storage controller adapted to access and control storage units of the at least one storage subsystem wherein the storage subsystem includes a plurality of resources and a timer; the computer program product comprising at least one non-transitory computer readable storage medium having computer readable program code embodied therein that is enabled to cause operations to be performed, the operations comprising:
    monitoring the duration of time between receipt of a first command from a command initiator and receipt of a second command from said command initiator and associated with said first command;
    dynamically setting a timeout period as a function of said monitored duration of time;
    receiving a plurality of additional commands including a third command from said command initiator and partially executing said plurality of additional commands wherein partially executing the third command includes setting a timer for the duration of said dynamically set timeout period and obtaining priority over a first resource which is also associated with execution of a command of said plurality of additional commands other than said third command;
    detecting a deadlock condition as a function of expiration of said dynamically set timeout period before execution of the third command is completed, wherein the deadlock condition results from completion of execution of the third command being blocked by another command of said plurality of additional commands having obtained priority over a second resource which is also associated with execution of the third command;
    releasing priority of the third command over the first resource upon detection of said deadlock condition; and
    reobtaining priority of the third command over the first resource.

16. The computer program product of claim 15 wherein the operations further comprise:
    dynamically setting a maximum number of command retries as a function of said monitored duration of time; and
    retrying execution of the third command up to the dynamically set maximum number of command retries.

17. The computer program product of claim 15 wherein the first command is a command of a chain of commands of an input/output operation issued by a host to a storage controller and wherein the second command is a reset command issued by the host in response to a missing interrupt handler upon expiration of a predetermined time period.

18. The computer program product of claim 15 wherein the first resource is a task lock for a class of input/output operations executed by a storage controller in response to a command from a host.

19. The computer program product of claim 18 wherein the second resource is a range of storage locations in a storage unit of the storage subsystem.

20. The computer program product of claim 15 wherein the third command is an establish point-in-time snap copy command associated with the first resource which includes a source storage extent and a target storage extent and wherein an additional command is a write command to write data to an extent overlapping said source storage extend and said target storage extent.

21. The computer program product of claim 15 wherein the third command is a first incremental establish point-in-time snap copy command associated with the first resource which includes a source storage extent and a target storage extent and wherein an additional command is a write command to write data to an extent overlapping said source storage extent, and wherein an additional command is a second incremental establish point-in-time snap copy command associated with a source storage extent which overlaps with said source storage extent of the first incremental establish point-in-time snap copy command.

* * * * *